US012634053B2

(12) United States Patent
Gao et al.

(10) Patent No.: US 12,634,053 B2
(45) Date of Patent: May 19, 2026

(54) UPLINK CONTROL INFORMATION TRANSMISSION METHOD, UPLINK CONTROL INFORMATION RECEPTION METHOD, TERMINAL AND NETWORK DEVICE

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 422 days.

(21) Appl. No.: 18/256,009

(22) PCT Filed: Dec. 3, 2021

(86) PCT No.: PCT/CN2021/135551
§ 371 (c)(1),
(2) Date: Jun. 5, 2023

(87) PCT Pub. No.: WO2022/117103
PCT Pub. Date: Jun. 9, 2022

(65) Prior Publication Data
US 2024/0056232 A1      Feb. 15, 2024

(30) Foreign Application Priority Data

Dec. 4, 2020    (CN) .......................... 202011412815.2

(51) Int. Cl.
*H04L 1/1829* (2023.01)
*H04L 5/00* (2006.01)
(52) U.S. Cl.
CPC .......... *H04L 1/1861* (2013.01); *H04L 1/1854* (2013.01)

(58) Field of Classification Search
CPC ... H04L 1/1854; H04L 1/1861; H04L 1/1812; H04L 5/0055
See application file for complete search history.

(56) References Cited

U.S. PATENT DOCUMENTS

2018/0092122 A1      3/2018  Babaei et al.
2020/0106566 A1*    4/2020  Yeo ........................ H04L 1/1812
(Continued)

FOREIGN PATENT DOCUMENTS

CN          110830184 A      2/2020
CN          111148077 A      5/2020

OTHER PUBLICATIONS

International Search Report and Written Opinion issued Feb. 7, 2022 in International Application No. PCT/CN2021/135551.
(Continued)

*Primary Examiner* — Kent Krueger
(74) *Attorney, Agent, or Firm* — Harness, Dickey & Pierce, P.L.C.

(57) ABSTRACT

An uplink control information transmission method, an uplink control information reception method, a terminal and a network device are disclosed. The method includes: receiving, by the terminal, a first downlink control information (DCI), where a first indication field of the first DCI is used to determine at least one of the following: a bit number of a second hybrid automatic repeat request-acknowledgement (HARQ-ACK), whether the second HARQ-ACK exists, or whether the second HARQ-ACK is multiplexed with a first HARQ-ACK; and transmitting, by the terminal, HARQ-ACK according to the first indication field. The first DCI is DCI corresponding to a first uplink channel carrying the first HARQ-ACK; and the second HARQ-ACK is HARQ-ACK multiplexed with the first HARQ-ACK.

19 Claims, 4 Drawing Sheets

(56) References Cited

U.S. PATENT DOCUMENTS

| | | | | |
|---|---|---|---|---|
| 2020/0195388 | A1* | 6/2020 | Seo | H04L 1/1861 |
| 2021/0219329 | A1 | 7/2021 | Zhou et al. | |
| 2021/0250131 | A1 | 8/2021 | Fan et al. | |
| 2022/0360950 | A1* | 11/2022 | Li | H04L 5/0051 |
| 2023/0038686 | A1* | 2/2023 | Liu | H04L 5/0055 |
| 2023/0300816 | A1* | 9/2023 | Guo | H04W 72/11 |
| | | | | 370/329 |
| 2024/0048289 | A1* | 2/2024 | Takahashi | H04L 1/1812 |

OTHER PUBLICATIONS

Mediatek Inc., "Discussion on HARQ operation for NR MBS reliable transmission," 3GPP TSG RAN WG1 #103-e, R1-2008962, Nov. 1, 2020.

Samsung, "Enhancements on HARQ for NTN," 3GPP TSG RAN WG1 #103-e, R1-2008166, Nov. 1, 2020.

Futurewei, "Improving reliability for MC/BC services," 3GPP TSG RAN WG1 #103-e, R1-2007557, Nov. 1, 2020.

Search Report for European Application No. 21900125.2 dated Oct. 8, 2024.

Nokia et al: "On UL intra-UE prioritization and multiplexing enhancements," 3GPP Draft; RI-2008843, 3rd Generation Partnership Project (3GPP), Mobile Competence Centre; 650, Route Des Lucioles; F-06921 Sophia-Antipolis Cedex ; France, vol. RAN WGI, No. e-Meeting; Oct. 26, 2020-Nov. 13, 2020, Nov. 1, 2020 (Nov. 1, 2020}, XP052350778, Retrieved from the Internet: URL:https:// ftp.3gpp.org/tsg_ran/WG1_RL1/TSGR1_103-e/Docs/RI-2008843. zip RI-2008843_Nokia_Rel-17_IIoT_intra-UE.docx, [retrieved on Nov. 1, 2020].

ZTE: "Discussion on enhanced intra-UE multiplexing," 3GPP Draft; RI-2008824, 3rd Generation Partnership Project (3GPP), Mobile Competence Centre; 650, Route Des Lucioles ; F-06921 Sophia-Antipolis Cedex; France, vol. RAN WGI, No. e-Meeting; Oct. 26, 2020-Nov. 13, 2020 Nov. 1, 2020 {Nov. 1, 2020}, XP052350759, Retrieved from the Internet: URL:https://ftp.3gpp.org/tsg_ran/WG1_ RL1/T SGR1_103-e/Docs/RI-2008824.zip RI-2008824 Discussion on enhanced intra-UE multiplexing.docx[retrieved on Nov. 1, 2020].

ETRI: "Intra-UE Multiplexing/Prioritization", 3GPP Draft; RI-2009013, 3rd Generation Partnership Project {3GPP), Mobile Competence Centre; 650, Route Des Lucioles ; F-06921 Sophia-Antipolis Cedex; France, vol. RAN WGI, No. e-Meeting; Oct. 26, 2020-Nov. 13, 2020, Nov. 1, 2020 (Nov. 1, 2020), XP052350942, Retrieved from the Internet: URL:https://ftp.3gpp.org/tsg_ran/WG1_RL1/TSGR1_ 103-e/Docs/RI-2009013.zip RI-2009013 Intra-UE MultiplexingPrioritization-final.docx [retrieved on Nov. 1, 2020].

* cited by examiner network device terminal case 1 case 2

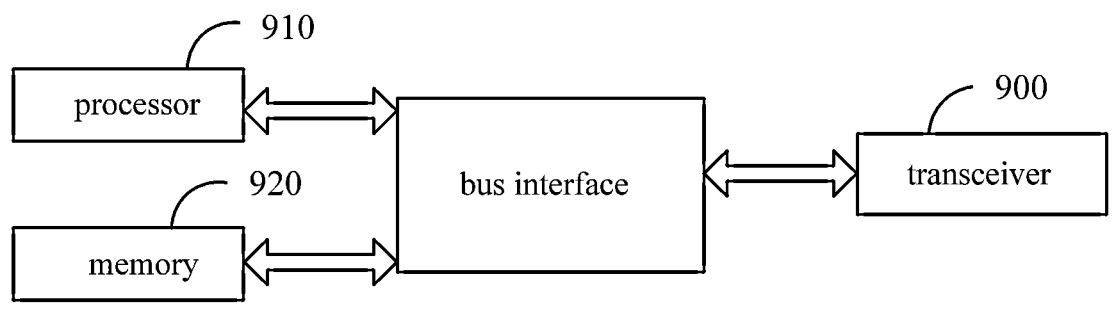
FIG. 9
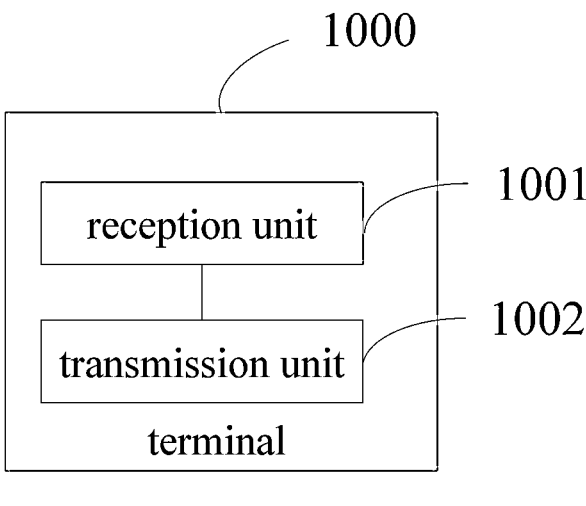
FIG. 10
FIG. 11

UPLINK CONTROL INFORMATION TRANSMISSION METHOD, UPLINK CONTROL INFORMATION RECEPTION METHOD, TERMINAL AND NETWORK DEVICE

CROSS-REFERENCE TO RELATED APPLICATIONS

This application is the U.S. national phase of PCT Application PCT/CN2021/135551 filed on Dec. 3, 2021, which claims the priority of Chinese Application No. 202011412815.2, filed on Dec. 4, 2020, the disclosure of each of which are incorporated in their entirety by reference herein.

TECHNICAL FIELD

The present disclosure relates to the field of communication technologies, and in particular to an uplink control information transmission method, an uplink control information reception method, a terminal and a network device.

BACKGROUND

In some communication systems (i.e., the fifth generation (5G) system), a terminal may need to transmit multiple hybrid automatic repeat request-acknowledgement (HARQ-ACK). When the terminal transmits multiple HARQ-ACK codebooks on the same channel, one HARQ-ACK codebook (for example, HARQ-ACK codebook with low priority) is likely to experience packet loss due to its poor transmission performance, resulting in instability of a bit number in the HARQ-ACK codebook, which may lead to a problem of inconsistent understanding between the terminal and a network device on the bit number of HARQ-ACK transmitted by the terminal.

SUMMARY

Embodiments of the present disclosure provide an uplink control information transmission method, an uplink control information reception method, a terminal and a network device, which can solve the problem of inconsistent understanding between the terminal and the network device on the bit number of HARQ-ACK transmitted by the terminal.

One embodiment of the present disclosure provides an uplink control information transmission method, including:

receiving, by a terminal, a first downlink control information (DCI), wherein a first indication field of the first DCI is used to determine at least one of the following: a bit number of a second hybrid automatic repeat request-acknowledgement (HARQ-ACK), whether the second HARQ-ACK exists, or whether the second HARQ-ACK is multiplexed with a first HARQ-ACK; and transmitting, by the terminal, HARQ-ACK according to the first indication field;

wherein the first DCI is DCI corresponding to a first uplink channel carrying the first HARQ-ACK.

Optionally, in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indication field except for the first indication state indicates a corresponding type of information for determining the total bit number of the second HARQ-ACK, where the total bit number is greater than 0; or, under a first condition, a second indication state of the first indication field is used to, indicate a type of information for determining the total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information for determining the total bit number of the second HARQ-ACK, where the total bit number is greater than 0.

Optionally, the information for determining the total bit number of the second HARQ-ACK includes: the total bit number of the second HARQ-ACK, or the total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indication state and an eighth indication state; wherein the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in time domain between the first uplink channel and a second uplink channel, wherein the second uplink channel is a channel carrying the second HARQ-ACK;

the second condition includes:

there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK.

Optionally, in case that each indication state of the first indication field indicates a corresponding type of information for determining the total bit number of the second HARQ-ACK, if it is determined that there is overlap in time domain between a second uplink channel that does not carry the second HARQ-ACK and the first uplink channel, indication information in the first indication field is ignored.

Optionally, in case that the first indication field includes the third indication state and the fourth indication state, if it is determined that there is overlap in time domain between a second uplink channel that does not carry the second HARQ-ACK and the first uplink channel, indication information in the first indication field is ignored.

Optionally, the transmitting, by the terminal, HARQ-ACK according to the first indication field, includes:

determining, by the terminal, the bit number of the second HARQ-ACK according to the first indication field; and transmitting, by the terminal, HARQ-ACK according to the bit number of the second HARQ-ACK.

Optionally, the transmitting, by the terminal, HARQ-ACK according to the bit number of the second HARQ-ACK, includes:

according to the bit number of the second HARQ-ACK, simultaneously transmitting the first HARQ-ACK and the second HARQ-ACK on the same channel; or, in case that the bit number of the second HARQ-ACK is greater than 0 or it is determined to transmit the second HARQ-ACK, simultaneously transmitting the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, transmitting the first HARQ-ACK on the first uplink channel.

Optionally, the determining, by the terminal, the bit number of the second HARQ-ACK according to the first indication field, includes:

in case that there is overlap in the time domain between the first uplink channel carrying the first HARQ-ACK and the second uplink channel carrying the second HARQ-ACK, determining, by the terminal, the bit number of the second HARQ-ACK according to the first indication field.

Optionally, a priority of the first uplink channel is higher than a priority of a second uplink channel carrying the second HARQ-ACK; or, a priority of the first HARQ-ACK is higher than a priority of the second HARQ-ACK; or the first HARQ-ACK is HARQ-ACK of a unicast, and the second HARQ-ACK is HARQ-ACK of a multicast.

Optionally, the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is DCI used to schedule PDSCH that requires HARQ-ACK feedback on the PUCCH, or, the first DCI is DCI used to indicate semi-persistent scheduling (SPS) PDSCH release that requires HARQ-ACK feedback on the PUCCH; or, in case that the first uplink channel is PUSCH, the first DCI is DCI for scheduling the PUSCH.

Optionally, in case that there are multiple first DCIs, values of first indication fields in the multiple first DCIs are the same, or the terminal transmits HARQ-ACK according to the first indication field in the last DCI.

One embodiment of the present disclosure provides an uplink control information reception method, including:

transmitting, by a network device, a first downlink control information (DCI), wherein a first indication field of the first DCI is used to determine at least one of the following: a bit number of a second HARQ-ACK, whether the second HARQ-ACK exists, or whether the second HARQ-ACK is multiplexed with a first HARQ-ACK; and receiving, by the network device, HARQ-ACK according to the first indication field;

wherein the first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indication field except for the first indication state indicates a corresponding type of information for determining the total bit number of the second HARQ-ACK, where the total bit number is greater than 0; or, under a first condition, a second indication state of the first indication field is used to, indicate a type of information for determining the total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information for determining the total bit number of the second HARQ-ACK, where the total bit number is greater than 0.

Optionally, the information for determining the total bit number of the second HARQ-ACK includes:

the total bit number of the second HARQ-ACK, or the total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indication state and an eighth indication state; wherein the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or,

7 there is overlap in time domain between the first uplink channel and a second uplink channel, wherein the second uplink channel is a channel carrying the second HARQ-ACK;

the second condition includes:

there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK.

Optionally, the receiving, by the network device, HARQ-ACK according to the first indication field, includes:

determining, by the network device, the bit number of the second HARQ-ACK, according to the first indication field; and receiving, by the network device, HARQ-ACK according to the bit number of the second HARQ-ACK.

Optionally, the receiving, by the network device, HARQ-ACK according to the bit number of the second HARQ-ACK, includes:

according to the bit number of the second HARQ-ACK, simultaneously receiving the first HARQ-ACK and the second HARQ-ACK on the same channel; or, in case that the bit number of the second HARQ-ACK is greater than 0 or it is determined to transmit the second HARQ-ACK, simultaneously receiving the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, receiving the first HARQ-ACK on the first uplink channel.

Optionally, the determining, by the network device, the bit number of the second HARQ-ACK, according to the first indication field, includes:

in case that there is overlap in time domain between the first uplink channel carrying the first HARQ-ACK and the second uplink channel carrying the second HARQ-ACK, determining, by the network device, the bit number of the second HARQ-ACK, according to the first indication field.

Optionally, a priority of the first uplink channel is higher than a priority of a second uplink channel carrying the second HARQ-ACK; or, a priority of the first HARQ-ACK is higher than a priority of the second HARQ-ACK; or, the first HARQ-ACK is HARQ-ACK of a unicast, and the second HARQ-ACK is HARQ-ACK of a multicast.

Optionally, the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is DCI used to schedule PDSCH that requires HARQ-ACK feedback on the PUCCH, or, the first DCI is DCI used to indicate semi-persistent scheduling (SPS) PDSCH release that requires HARQ-ACK feedback on the PUCCH; or, in case that the first uplink channel is PUSCH, the first DCI is DCI for scheduling the PUSCH.

Optionally, in case that there are multiple first DCIs, values of first indication fields in the multiple first DCIs are set to be the same, or HARQ-ACK is transmitted according to the first indication field in the last DCI.

One embodiment of the present disclosure provides a terminal, including: a memory, a transceiver and a processor;

wherein the memory is used to store a computer program; the transceiver is used to send and receive data under control of the processor; the processor is used to read the computer program in the memory 820 and perform the following operations:

receiving a first downlink control information (DCI), wherein a first indication field of the first DCI is used to determine at least one of the following: a bit number of a second hybrid automatic repeat request-acknowledgement (HARQ-ACK), whether the second HARQ-ACK exists, or whether the second HARQ-ACK is multiplexed with a first HARQ-ACK; and receiving HARQ-ACK according to the first indication field;

wherein the first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indication field except for the first indication state indicates a corresponding type of information for determining the total bit number of the second HARQ-ACK, where the total bit number is greater than 0; or, under a first condition, a second indication state of the first indication field is used to, indicate a type of information for determining the total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information for determining the total bit number of the second HARQ-ACK, where the total bit number is greater than 0.

Optionally, the information for determining the total bit number of the second HARQ-ACK includes:

the total bit number of the second HARQ-ACK, or the total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indication state and an eighth indication state; wherein the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in time domain between the first uplink channel and a second uplink channel, wherein the second uplink channel is a channel carrying the second HARQ-ACK;

the second condition includes:

there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK.

Optionally, in case that each indication state of the first indication field indicates a corresponding type of information for determining the total bit number of the second HARQ-ACK, if it is determined that there is overlap in time domain between a second uplink channel that does not carry the second HARQ-ACK and the first uplink channel, indication information in the first indication field is ignored.

Optionally, in case that the first indication field includes the third indication state and the fourth indication state, if it is determined that there is overlap in time domain between a second uplink channel that does not carry the second HARQ-ACK and the first uplink channel, indication information in the first indication field is ignored.

Optionally, the receiving HARQ-ACK according to the first indication field, includes:

determining the bit number of the second HARQ-ACK according to the first indication field; and receiving HARQ-ACK according to the bit number of the second HARQ-ACK.

Optionally, the receiving HARQ-ACK according to the bit number of the second HARQ-ACK, includes:

according to the bit number of the second HARQ-ACK, simultaneously transmitting the first HARQ-ACK and the second HARQ-ACK on the same channel; or, in case that the bit number of the second HARQ-ACK is greater than 0 or it is determined to transmit the second HARQ-ACK, simultaneously transmitting the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, transmitting the first HARQ-ACK on the first uplink channel.

Optionally, the determining the bit number of the second HARQ-ACK according to the first indication field, includes:

in case that there is overlap in the time domain between the first uplink channel carrying the first HARQ-ACK and the second uplink channel carrying the second HARQ-ACK, determining the bit number of the second HARQ-ACK according to the first indication field.

Optionally, a priority of the first uplink channel is higher than a priority of a second uplink channel carrying the second HARQ-ACK; or, a priority of the first HARQ-ACK is higher than a priority of the second HARQ-ACK; or the first HARQ-ACK is HARQ-ACK of a unicast, and the second HARQ-ACK is HARQ-ACK of a multicast.

Optionally, the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is DCI used to schedule PDSCH that requires HARQ-ACK feedback on the PUCCH, or, the first DCI is DCI used to indicate semi-persistent scheduling (SPS) PDSCH release that requires HARQ-ACK feedback on the PUCCH; or, in case that the first uplink channel is PUSCH, the first DCI is DCI for scheduling the PUSCH.

Optionally, in case that there are multiple first DCIs, values of first indication fields in the multiple first DCIs are the same, or the terminal transmits HARQ-ACK according to the first indication field in the last DCI.

One embodiment of the present disclosure provides a network device, including: a memory, a transceiver and a processor;

wherein the memory is used to store a computer program; the transceiver is used to send and receive data under control of the processor; the processor is used to read the computer program in the memory 820 and perform the following operations:

transmitting a first downlink control information (DCI), wherein a first indication field of the first DCI is used to determine at least one of the following: a bit number of a second HARQ-ACK, whether the second HARQ-ACK exists, or whether the second HARQ-ACK is multiplexed with a first HARQ-ACK; and receiving HARQ-ACK according to the first indication field;

wherein the first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indication field except for the first indication state indicates a corresponding type of information for determining the total bit number of the second HARQ-ACK, where the total bit number is greater than 0; or, under a first condition, a second indication state of the first indication field is used to, indicate a type of information for determining the total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information for determining the total bit number of the second HARQ-ACK, where the total bit number is greater than 0.

Optionally, the information for determining the total bit number of the second HARQ-ACK includes:

the total bit number of the second HARQ-ACK, or the total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indication state and an eighth indication state; wherein the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in time domain between the first uplink channel and a second uplink channel, wherein the second uplink channel is a channel carrying the second HARQ-ACK;

the second condition includes:

there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK.

Optionally, the receiving HARQ-ACK according to the first indication field, includes:

determining the bit number of the second HARQ-ACK, according to the first indication field; and receiving HARQ-ACK according to the bit number of the second HARQ-ACK.

Optionally, the receiving HARQ-ACK according to the bit number of the second HARQ-ACK, includes:

according to the bit number of the second HARQ-ACK, simultaneously receiving the first HARQ-ACK and the second HARQ-ACK on the same channel; or, in case that the bit number of the second HARQ-ACK is greater than 0 or it is determined to transmit the second HARQ-ACK, simultaneously receiving the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, receiving the first HARQ-ACK on the first uplink channel.

Optionally, the determining the bit number of the second HARQ-ACK, according to the first indication field, includes:

in case that there is overlap in time domain between the first uplink channel carrying the first HARQ-ACK and the second uplink channel carrying the second HARQ-ACK, determining, by the network device, the bit number of the second HARQ-ACK, according to the first indication field.

Optionally, a priority of the first uplink channel is higher than a priority of a second uplink channel carrying the second HARQ-ACK; or, a priority of the first HARQ-ACK is higher than a priority of the second HARQ-ACK; or the first HARQ-ACK is HARQ-ACK of a unicast, and the second HARQ-ACK is HARQ-ACK of a multicast.

Optionally, the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is DCI used to schedule PDSCH that requires HARQ-ACK feedback on the PUCCH, or, the first DCI is DCI used to indicate semi-persistent scheduling (SPS) PDSCH release that requires HARQ-ACK feedback on the PUCCH; or, in case that the first uplink channel is PUSCH, the first DCI is DCI for scheduling the PUSCH.

Optionally, in case that there are multiple first DCIs, values of first indication fields in the multiple first DCIs are set to be the same, or HARQ-ACK is transmitted according to the first indication field in the last DCI.

One embodiment of the present disclosure provides a terminal, including:

a reception unit used to receive a first downlink control information (DCI), wherein a first indication field of the first DCI is used to determine at least one of the following: a bit number of a second hybrid automatic repeat request-acknowledgement (HARQ-ACK), whether the second HARQ-ACK exists, or whether the second HARQ-ACK is multiplexed with a first HARQ-ACK; and a transmission unit used to receive HARQ-ACK according to the first indication field;

wherein the first DCI is DCI corresponding to a first uplink channel carrying the first HARQ-ACK; and the second HARQ-ACK is HARQ-ACK multiplexed with the first HARQ-ACK.

One embodiment of the present disclosure provides a network device, including:

a transmission unit used to transmit a first downlink control information (DCI), wherein a first indication field of the first DCI is used to determine at least one of the following: a bit number of a second HARQ-ACK, whether the second HARQ-ACK exists, or whether the second HARQ-ACK is multiplexed with a first HARQ-ACK; and a reception unit used to receive HARQ-ACK according to the first indication field;

wherein the first DCI is DCI corresponding to a first uplink channel carrying the first HARQ-ACK; and the second HARQ-ACK is HARQ-ACK multiplexed with the first HARQ-ACK.

One embodiment of the present disclosure further provides a processor-readable storage medium, including a computer program stored thereon; wherein the computer program is used to cause a processor to execute the above uplink control information transmission method provided in the embodiments of the present disclosure, or, the computer program is used to cause the processor to execute the uplink control information reception method provided in the embodiments of the present disclosure.

In this embodiment of the present disclosure, the terminal receives the first downlink control information DCI, and the first indication field of the first DCI is used to determine at least one of the following: the bit number of the second HARQ-ACK, whether the second HARQ-ACK exists, or whether the second HARQ-ACK is multiplexed with the first HARQ-ACK; and the terminal receives HARQ-ACK according to the first indication field; where the first DCI is a DCI corresponding to the first uplink channel carrying the first HARQ-ACK, and the second HARQ-ACK is HARQ-ACK multiplexed with the first HARQ-ACK. In this way, since the terminal receives HARQ-ACK according to the first indication field, thereby ensuring that the terminal and the network device have the same understanding of the bit number of the HARQ-ACK transmitted by the terminal.

BRIEF DESCRIPTION OF THE DRAWINGS

FIG. 9 is a structural diagram of a network device according to an embodiment of the present disclosure;

FIG. 10 is another structural diagram of a terminal according to an embodiment of the present disclosure; and FIG. 11 is another structural diagram of a network device according to an embodiment of the present disclosure.

DETAILED DESCRIPTION

In order to make technical problems to be solved, technical solutions and advantages of the present disclosure more apparent, the present disclosure will be described hereinafter in conjunction with the drawings and embodiments.

The terms "and/or" in the embodiments of the present disclosure are used to describe association relationship between associated objects, and indicate that there may be three relationships, for example, A and/or B means there are three situations, i.e., there is A alone, there are both of A and B, or, there is B alone. The character "/" generally means that relationship between associated objects before and after the character "/" is "or".

The term "plurality" in the embodiments of the present disclosure means two or more, and other quantifiers are similar.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide an uplink control information transmission method, an uplink control information reception method, a terminal and a network device, which can solve the problem of inconsistent understanding between the terminal and the network device on the bit number of HARQ-ACK transmitted by the terminal.

The method and the device are based on the same concept. Since principles of the method and the device for solving the problems are similar, implementation of the device and the method can be referred to each other, and duplication is not repeated.

The technical solutions provided in the embodiments of the present disclosure may be applicable to various systems, especially the fifth generation communication (5G) system. For example, applicable systems may be global system of mobile communication (GSM) system, code division multiple access (CDMA) system, wideband code division multiple access (WCDMA) general packet wireless service (GPRS) system, long term evolution (LTE) system, LTE frequency division duplex (FDD) system, LTE time division duplex (TDD) system, long term evolution advanced (LTE-A) system, universal mobile telecommunication system (UMTS), worldwide interoperability for microwave access (WiMAX) system, 5G new radio (NR) system, 6G system, etc. Each of the various systems includes a user equipment and a network device. The system may further include a core network part, such as an evolved packet system (EPS), a 5G system (5GS).

Figure 1:
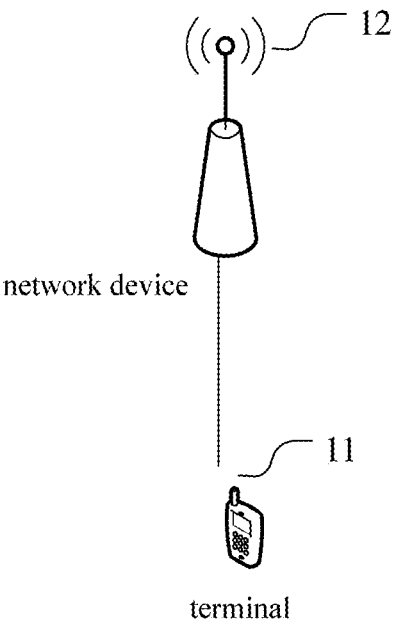
FIG. 1 is a schematic structural diagram of a network architecture to which an embodiment of the present disclosure can be applied.

Referring to FIG. 1, FIG. 1 is a schematic structural diagram of a network architecture applicable to an embodiment of the present disclosure. As shown in FIG. 1, the network architecture includes a terminal 11 and a network device 12.

The terminal involved in the embodiments of the present disclosure may be a device that provides voice and/or data connectivity to a user, a handheld device with a wireless connection function, or other processing device coupled to a wireless modem. In different systems, names of terminal devices may be different. For example, in the 5G system, the terminal device may be referred as user equipment (UE). A wireless terminal device may communicate with one or more core networks (CN) via a radio access network (RAN). The wireless terminal device may be a mobile terminal device such as a mobile phone (or referred as cell phone), or a computer with a mobile terminal device, such as a portable, pocket-sized, handheld, computer built-in or car mobile device, which exchange language and/or data with wireless access networks, for example, a personal communication service (PCS) phone, a cordless phone, a session initiated protocol (SIP) phone, a wireless local loop (WLL) station, a personal digital assistant (PDA) and other device. The wireless terminal device may also be referred to as system, subscriber unit, subscriber station, mobile station, mobile, remote station, access point, remote terminal, access terminal, user terminal, user agent, or user device, which are not limited in the embodiments of the present disclosure.

The network device involved in the embodiments of the present disclosure may be a base station, and the base station may include a plurality of cells for providing services for the terminal. According to different specific application scenarios, the base station may also be referred as an access point, or the base station may be a device in an access network that communicates with wireless terminal devices through one or more sectors on air interfaces, or other names. The network device may be used to exchange received frames with internet protocol (IP) packets, and act as a router between the wireless terminal device and the rest of the access network, where the rest of the access network may include an internet protocol (IP) communication network. The network device may also coordinate attribute management for air interfaces. For example, the network device involved in the embodiments of the present disclosure may be a base transceiver station (BTS) in global system for mobile communications (GSM) or code division multiple access (CDMA), a NodeB in wide-band code division multiple access (WCDMA), an evolutional Node B (eNB or e-NodeB) in long term evolution (LTE) system, a 5G base station (gNB) in the 5G network architecture (next generation system), a home evolved Node B (HeNB), a relay node, a femto, or a pico, which are not limited in the embodiments of the present disclosure. In some network structures, the network device may include a centralized unit (CU) node and a distributed unit (DU) node; and the centralized unit and the distributed unit may also be geographically separated.

Each of the network device and the terminal can use one or more antennas for multi input multi output (MIMO) transmission between the network device and the terminal. The MIMO transmission may be single user MIMO (SU-MIMO), or multiple user MIMO (MU-MIMO). According to forms and numbers of antenna combinations, MIMO transmission may be two dimensional-MIMO (2D-MIMO), three dimensional-MIMO (3D-MIMO), full dimensional-MIMO (FD-MIMO), or massive-MIMO, or diversity transmission, precoding transmission, or beamforming transmission.

In some communication systems (for example, the fifth generation new RAT (5G NR)), transmission of uplink channels with different physical layer priorities are supported, and there may be resource conflicts between uplink channels with different physical layer priorities of the same terminal, for example, on the same carrier, there is overlapping between symbols occupied by uplink channels with different priorities. In order to avoid increase of peak to average power ratio (PAPR) and power limitation caused by parallel transmission of multiple uplink channels at the same time on the same carrier, among conflicting channels, only channels with higher physical layer priorities can be transmitted, and channels with lower physical layer priorities may be discarded. In the embodiments of the present disclosure, in order to avoid discarding uplink control information (UCI) carried on a channel with a lower priority, it is supported that UCIs on multiple PUCCHs with different physical layer priorities can be multiplexed on the same channel.

Transmission of channels with different physical layer priorities may be as follows.

One terminal may support different service types, such as enhanced mobile broadband (eMBB) service and ultra-reliable and low latency communication (URLLC) service. Different service types have different requirements for reliability and transmission latency. Flows of URLLC services may occur sporadically and irregularly, and thus independently reserving different system resources for different services results in a relatively large overhead on system resources, and resources reserved for URLLC may not be used in many cases. In order to improve a utilization rate of the system resources, it is to support multiplexing of different services on the same resource. It may happen that an earlier scheduled data transmission is interrupted or cancelled by another later scheduled data transmission. For example, after a terminal is scheduled to transmit an eMBB service on a resource 1, when a URLLC service arrives, in order to meet the latency requirements of the URLLC service, it needs to be scheduled as soon as possible, which may occupy all or part (including time domain resources and/or frequency domain resources) of the resource 1 which has been allocated to the eMBB service, for URLLC transmission. For another example, it may be that all or part of symbols in time-domain resources (i.e., symbol sets) scheduled for eMBB on the same carrier are scheduled for URLLC transmission, then, regardless of whether frequency-domain resources overlap, because two uplink channels cannot be simultaneously transmitted on the same carrier, the eMBB service will be interrupted or canceled by the URLLC service.

In order to avoid mutual influence between services, different priorities can be defined for different services, so that when resource conflicts occur, channels with higher priorities are selected, and channels with lower priorities are discarded. Thus, in order to better support transmission of different services with different requirements, physical layer priorities are introduced in some protocols, and when channels with different physical layer priorities collide, i.e., multiple PUCCHs overlap in the time domain on the same carrier, or PUCCH and PUSCH overlap in the time domain on the same carrier, channels with lower priories are discarded and only channels with higher priorities are transmitted.

The physical layer priorities of PUCCH and PUSCH may be obtained in a default manner, through a DCI dynamic indication, or in a radio resource control (RRC) semi-static configuration. For example, when PUCCH carries a scheduling request (SR), the priority of PUCCH is determined by a priority corresponding to the SR carried on the PUCCH, and the priority corresponding to each SR configuration is configured by high-level signaling. When PUCCH carries HARQ-ACK of SPS PDSCH or HARQ-ACK of PDCCH for indicating SPS resource release (i.e., SPS PDSCH release), the priority of PUCCH is determined by a HARQ-ACK codebook index configured for SPS PDSCH through high-level signaling, i.e., the priority of PUCCH corresponding to HARQ-ACK codebook index 0 is low priority, and the priority of PUCCH corresponding to HARQ-ACK codebook index 1 is high priority. When PUCCH carries CSI (including periodic CSI and semi-persistent CSI (SP-CSI)), the priority of PUCCH may be a low priority by default. When DCI includes a priority indication field, a priority of PUCCH or PUSCH can be obtained through the priority indication field in DCI (or, PDCCH which is considered to be equivalent to DCI in the embodiment of the present disclosure, as DCI is a specific format used of PDCCH and having corresponding DCI is equivalent to having corresponding PDCCH) corresponding to PUCCH or PUSCH. For example, in case that DCI used by PDCCH includes a priority indication field, when the PDCCH schedules a PDSCH, the priority indication field can be used to indicate a priority of PUCCH carrying HARQ-ACK of the PDSCH. When PDCCH schedules a PUSCH, the priority indication field can be used to indicate a priority of the scheduled PUSCH, where the PUSCH includes a PUSCH that only carries a transport block (TB), or a PUSCH that only carries aperiodic channel state information (A-CSI), or a PUSCH carrying both the TB and the A-CSI. For PUSCH carrying SP-CSI, a priory of the PUSCH can be obtained through a priority indication field in DCI which activates the PUSCH carrying SP-CSI. If the DCI does not include a priority indication field or the priority is not configured in high-layer signaling, the priority is low priority by default.

UCI transmission in 5G NR may be as follows.

UCI may include information such as HARQ-ACK, channel state information (CSI), and SR, and the UCI may be transmitted on PUCCH. HARQ-ACK is a general term for acknowledgment (ACK) and non-acknowledgement (NACK), which is used for feedback on PDSCH or PDCCH indicating release of SPS resources (also known as SPS PDSCH release) and informs the network device whether PDSCH or PDCCH indicating release of SPS resources are received successfully. CSI is used to feed back downlink channel quality, thereby helping the network device to perform better downlink scheduling, such as selecting modulation and coding scheme (MCS) or configuring appropriate resource block (RB) resources according to CSI. The SR is used to, when the terminal needs to transmit uplink services, request transmission resources of PUSCH carrying the uplink services from the network device.

The 5G NR system can support two HARQ-ACK codebook generation methods: semi-static and dynamic. The HARQ-ACK codebook may be a HARQ-ACK feedback sequence generated for downlink transmission (including PDSCH and SPS PDSCH release) for HARQ-ACK feedback on the same time domain location or uplink channel.

Figure 2:
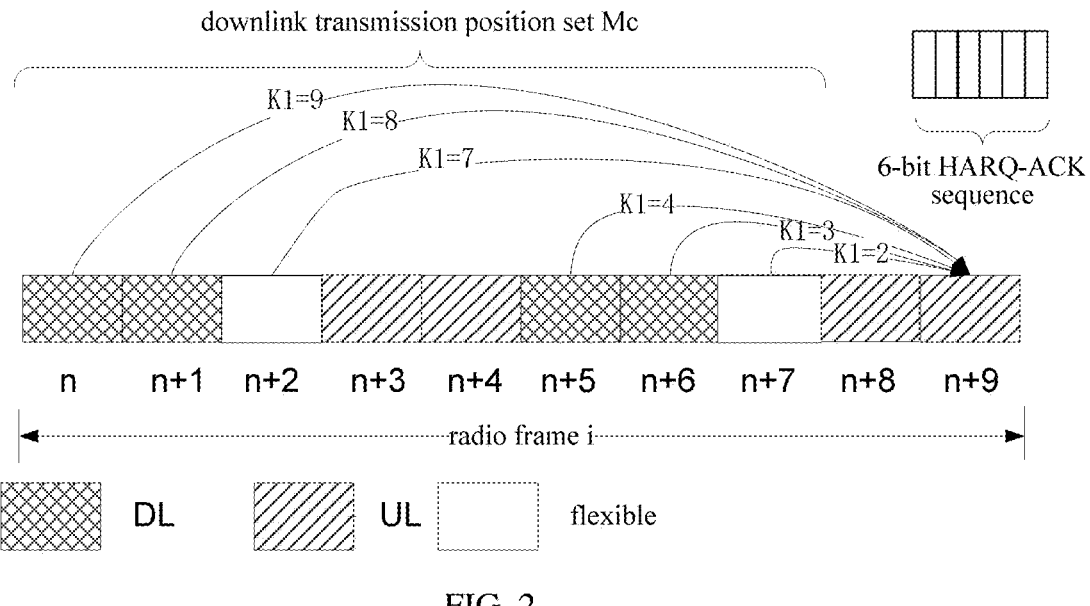
FIG. 2 is a schematic diagram of a semi-static HARQ-ACK codebook according to an embodiment of the present disclosure.

The semi-static HARQ-ACK codebook may be used to, according to each value in a K1 set which represents HARQ-ACK feedback timing, determine a position set Mc of downlink transmissions of HARQ-ACK feedback in a corresponding slot or sub-slot n on each carrier c (specifically, a currently activated BWP on the carrier), and then determine a HARQ-ACK codebook transmitted in the slot or sub-slot n according to Mc. As shown in FIG. 2, it is assumed that the K1 set is {2, 3, 4, 5, 6, 7, 8, 9} and slots for uplink transmission configured in the system are not included, in case that at most one PDSCH is transmitted in each slot and PDSCH only contains 1 TB, then, it is determined that a codebook size in slot (n+9) is 6 bits (if multiple PDSCHs can be transmitted by time division multiplexing (TDM) in one slot, multi-bit HARQ-ACK positions can be reserved in each slot; if one PDSCH contains multiple TBs or is configured with code block group (CBG) transmission, each PDSCH may correspond to more bits of HARQ-ACK, thereby changing the codebook size in slot (n+9)). The advantage of the semi-static HARQ-ACK codebook is that it can ensure that the terminal and network device have the same understanding of the size of the codebook in a relatively stable manner. However, an overhead of the semi-static HARQ-ACK codebook is relatively large, even if only a few transmissions are scheduled in the downlink transmission position set Mc, it still needs to be fed back according to the maximum range. In order to reduce the feedback overhead, a fallback method of the semi-static HARQ-ACK codebook is proposed. That is, if only one downlink transmission is scheduled using fallback DCI (such as DCI format 1-0) within the Mc range and a downlink assignment index (DAI) field in the DCI indicates "1", when only one SPS PDSCH is received, 1-bit HARQ-ACK is generated only for the received downlink transmission, and it is no longer necessary to generate a HARQ-ACK codebook of a fixed-size determined according to the K1 set.

Figure 3:
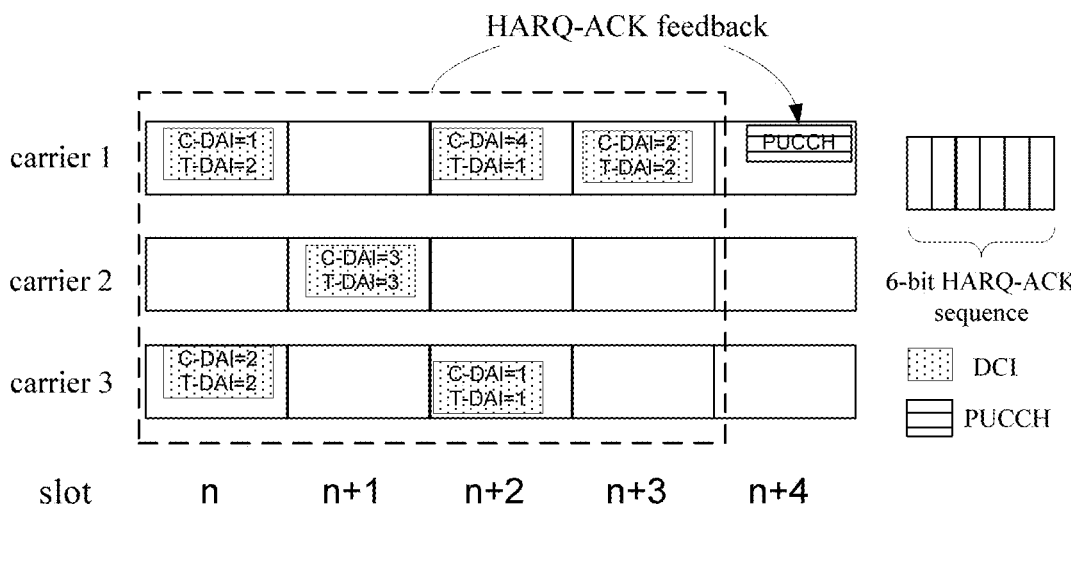
FIG. 3 is a schematic diagram of a dynamic HARQ-ACK codebook according to an embodiment of the present disclosure.

The dynamic HARQ-ACK codebook may be used to perform HARQ-ACK sorting according to indication of a counter-downlink assignment index (C-DAI) field in DCI for scheduling downlink transmission, and determine a total bit number of the HARQ-ACK codebook according to a total-downlink assignment index (T-DAI) field; thus, the size of the HARQ-ACK codebook can be dynamically adjusted according to actual scheduling at different feedback moments, thereby saving HARQ-ACK feedback overhead. Specifically, PDCCH monitoring occasion (MO) corresponding to an activated BWP on a carrier can be determined first according to K1, K0 (which is slot interval between PDCCH and PDSCH scheduled by the PDCCH, i.e., scheduling timing) and a configured number of repeated transmissions (if configured). If there are multiple carriers, PDCCH MOs on different carriers may not be aligned in time, then the PDCCH MOs on multiple carriers are sorted in chronological order to form a large PDCCH MO set, and one MO of the PDCCH MO set includes MOs that overlap in time domain on multiple carriers. In this PDCCH MO set, C-DAI indicates, in an order of frequency domain and then the time domain, a cumulative number of PDSCHs or PDCCHs that indicate SPS PDSCH release, which have been transmitted up to a current PDCCH MO on a current carrier; T-DAI indicates a total number of PDSCHs or PDCCHs that indicate SPS PDSCH release, which have been transmitted on all carriers up to a current PDCCH MO. When the network device sends DCI to schedule PDSCH transmission, it is ensured that C-DAI is cumulatively counted in frequency domain order in DCI on different carriers on the same MO, and T-DAI has the same value in all DCIs in the same MO and indicates that a total number of DCIs scheduled on all frequency domains in this MO. As shown in FIG. 3, it is assumed that both C-DAI and T-DAI are 2 bits, 1 state of 2 bits can be multiplexed to indicate 1, 5, 9 . . . , 1 state can be multiplexed to indicate 2, 6, 10 . . . , 1 state can be multiplexed to indicate 3, 7, 11 . . . , 1 state can be multiplexed to indicate 4, 8, 12 . . . . The terminal detects a PDCCH using a certain DCI format (such as one or more of format 1-0, format 1-1, and format 1-2) in a determined PDCCH MO set, and generates a HARQ-ACK codebook according to DAI information (including C-DAI and T-DAI) in the received PDCCH. According to T-DAI scheduling in the last DCI in FIG. 3, the terminal can determine that a total bit number is 6 (assuming that one PDSCH corresponding to each DAI count is only corresponds to 1-bit HARQ-ACK, if one PDSCH corresponds to A-bit HARQ-ACK, then here is 6*A bit).

Overlap between PUCCH and PUCCH/PUSCH with the same priority can be as follows.

The NR does not support parallel transmission of PUCCH and PUSCH at the same time, no matter on the same carrier or on different carriers. When PUCCH and PUSCH (without special explanation, generally PUCCH and PUSCH refer to PUCCH and PUSCH that do not use repeated transmission) overlap in time domain resources, in case that a predetermined timeline is met, UCI (which is, generally, HARQ-ACK and CSI) is transferred from PUCCH to PUSCH; in case that there is an SR, the SR is not transmitted on the PUSCH and the SR is discarded. If there are multiple PUSCHs overlapping with the PUCCH, one PUSCH is selected according to a predetermined rule, where PUSCH carrying A-CSI is preferentially selected; if PUSCH with PDCCH scheduling (DG PUSCH) and PUSCH without PDCCH scheduling (CG PUSCH, SP-CSI PUSCH, etc.) exist at the same time, DG PUSCH is preferentially selected; after selection according to the above rule, if there are PUSCHs on multiple carriers, PUSCH on a carrier with a smaller carrier index is preferentially selected; if there are multiple non-overlapping PUSCHs in time domain overlapping with PUCCH on the selected carrier, the earliest PUSCH is preferentially selected.

Definition of the timeline may be that: if PUCCH or PUSCH has a corresponding PDCCH (for example, HARQ-ACK carried by PUCCH is HARQ-ACK of PDSCH with PDCCH scheduling or HARQ-ACK of PDCCH indicating release of downlink SPS resources), the PDCCH for scheduling PDSCH or the PDCCH indicating release of downlink SPS resources is PDCCH corresponding to the PUCCH (also referred to as PDCCH for scheduling the PUCCH), and PDCCH for scheduling PUSCH is PDCCH corresponding to the PUSCH. A first symbol of a channel with an earliest start moment in the overlapping PUCCH and PUSCH is taken as a target symbol. If there are multiple channels with the same start moment, a channel is selected randomly, and a first symbol of the selected channel is taken as a target symbol. The target symbol needs to meet the following timeline to perform multiplexing transmission, otherwise it is considered as an error scheduling.

Timeline1: the target symbol is not earlier than a first symbol (including cyclic prefix (CP)) after T1mux time after a last symbol of any PDSCH or SPS PDSCH release that requires HARQ-ACK feedback on PUCCH, that is, a time interval between the target symbol and the last symbol of any one of the above PDSCH or SPS PDSCH releases is not less than T1mux time. T1mux is related to processing delay of PDSCH, and may be calculated according to a predetermined formula and related parameters. The purpose of the timeline is to ensure that obtaining and preparation of HARQ-ACK can be completed before transmission of finally determined channel for transmitting the HARQ-ACK starts.

Timeline2: the target symbol is not earlier than a first symbol (including CP) after a T2mux time after a last symbol of any PDCCH (including PDCCH indicating SPS PDSCH release) that schedules PDSCH (if any) and PUSCH (if any), that is, a time interval between the target symbol and the last symbol of any above PDCCH is not less than T2mux time. T2mux is related to processing delay of PUSCH, and may be calculated according to a predetermined formula and related parameters. The purpose of this timeline is to ensure that when UCI needs to be transferred to PUSCH, PDCCH for scheduling the PUSCH can be obtained before preparation of the PUCCH starts, so that it is determined that there is no need to prepare UCI transmission on the PUCCH, and transmission preparation including UCI can be completed before transmission of PUSCH starts, that is, obtaining and multiplexing of UCI is completed, and preparation of TB (such as encoding, modulation, scrambling, etc.) is completed. If it is multiplexing between multiple PUCCHs, this T2mux is used to simulate preparation time for CSI and SR multiplexing with HARQ-ACK.

If HARQ-ACK carried by PUCCH does not have a corresponding PDCCH (that is, the HARQ-ACK is HARQ-ACK of SPS PDSCH), at this point, there is no PDCCH for scheduling the PDSCH. If there is no PUSCH or PUSCH has no corresponding PDCCH, it is only needed to check T1mux and is it not needed to check T2mux. If CSI and/or SR are carried on PUCCH, it is not needed to check T1mux, because there is no corresponding PDSCH. Further, if there is no PUSCH or PUSCH has no corresponding PDCCH, it is not needed to check T2mux.

If PUCCH and PUCCH overlap, at least one PUCCH is repeatedly transmitted (that is, occupying multiple slots and repeatedly transmitting UCI in each slot), then, only for overlapping repetitions, repetitions with higher priorities are transmitted and repetitions with lower priorities are discarded, thereby not affecting repetitions that do not overlap. If PUCCH overlaps with repeatedly transmitted PUSCH, in case that the PUSCH uses slot-based repetition transmission (R15 repetition transmission, or repetition type A defined in a protocol), UCI carried by PUCCH is transferred to one or more PUSCH slots that overlap with the PUCCH. When the PUSCH adopts the repetition type B defined by the protocol, UCI carried by PUCCH is transferred to an earliest actual repetition PUSCH (which is repetition PUSCH obtained after segmentation based on unavailable symbols, DL symbols, slot boundaries, etc.) that overlaps with the PUCCH and contains more than 1 symbol. The above one or more repetition PUSCHs that overlap with PUCCH need to meet the multiplexing timeline. If multi-slot PUCCH overlaps with single-slot or multi-slot PUSCH, PUSCH overlapping with the PUCCH is discarded to ensure that the repetition transmission of the PUCCH is not interrupted.

It is to be noted that the above descriptions are only examples of features adopted by the embodiments of the present disclosure, and do not limit the solutions protected by the embodiments of the present disclosure.

Figure 4:
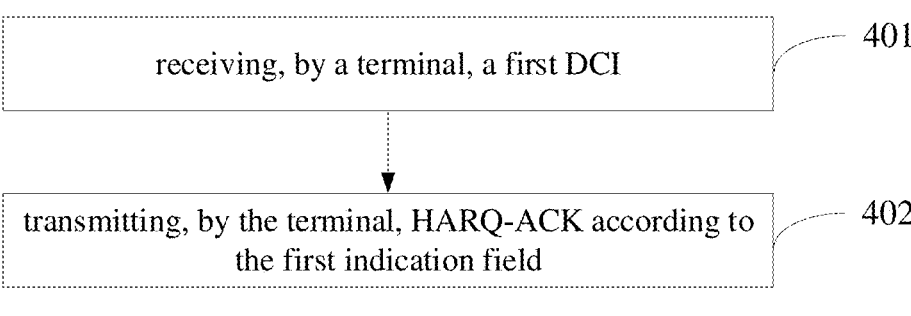
FIG. 4 is a flowchart of an uplink control information transmission method according to an embodiment of the present disclosure.

Referring to FIG. 4, FIG. 4 is a flowchart of an uplink control information transmission method according to an embodiment of the present disclosure. As shown in FIG. 4, the method includes the following steps:

Step 401: receiving, by a terminal, a first DCI, where a first indication field of the first DCI is used to determine at least one of the following: a bit number of a second HARQ-ACK, whether the second HARQ-ACK exists, whether the second HARQ-ACK is multiplexed with a first HARQ-ACK;

Step 402: transmitting, by the terminal, HARQ-ACK according to the first indication field.

The first DCI is DCI corresponding to a first uplink channel carrying the first HARQ-ACK; and the second HARQ-ACK is HARQ-ACK multiplexed with the first HARQ-ACK. It is to be noted that multiplexing transmission refers to simultaneously transmitting the first HARQ-ACK and the second HARQ-ACK on the same channel resource according to a predetermined transmission mode.

The above receiving the first DCI may include: receiving the DCI transmitted by a network device. The network device may transmit one or more DCIs, and the terminal may receive one or more DCIs. In case of receiving multiple first DCIs, the terminal may receive HARQ-ACK according to the first indication fields in some or all of the multiple first DCIs.

The first indication field of the first DCI may be one or more bit fields in the first DCI. In an optional implementation manner, the first indication field is reuse of existing bits in the first DCI, or, the first indication field is a newly added bit in the first DCI. The existing bits in the first DCI may be bits in the first DCI already defined in the protocol, and the newly added bit in the first DCI are one or more bits added in the DCI defined in the protocol.

The above first indication field is used to determine the bit number of the second HARQ-ACK may be that the first indication field indicates information of a total bit number of the second HARQ-ACK, such as a total bit number of the second HARQ-ACK (for example, 0, 1, 2, 4 bits, etc.), or the first indication field indicates a total number of downlink transmissions corresponding to the second HARQ-ACK. The downlink transmission corresponding to the second HARQ-ACK specifically includes PDSCH or SPS PDSCH release for which the second HARQ-ACK is needed.

Whether the second HARQ-ACK exists may be that whether there is a second HARQ-ACK multiplexed with the first HARQ-ACK.

It is to be noted that in case that the first indication field does not indicate whether the second HARQ-ACK exists, whether the second HARQ-ACK exists can be determined according to the information of the bit number of the second HARQ-ACK, for example, 0 bits means that the second HARQ-ACK does not exist, and non-0 bits means that the second HARQ-ACK exists; in case that the first indication field does not indicate whether the second HARQ-ACK is multiplexed with a first HARQ-ACK, whether the second HARQ-ACK is multiplexed with the first HARQ-ACK, can be determined according to at least one of the information of the bit number of the second HARQ-ACK and whether the second HARQ-ACK exists. For example, if the second HARQ-ACK exists, it can be determined that the second HARQ-ACK is multiplexed with the first HARQ-ACK; otherwise, it can be determined that the second HARQ-ACK is not multiplexed with the first HARQ-ACK. If the bit number of the second HARQ-ACK is 0, it can be determined that the second HARQ-ACK is not multiplexed with the first HARQ-ACK; otherwise, it can be determined that the second HARQ-ACK is multiplexed with the first HARQ-ACK.

The above terminal receiving HARQ-ACK according to the first indication field may include: according to at least one of the following: the bit number of the second HARQ-ACK, whether the second HARQ-ACK exists or whether the second HARQ-ACK is multiplexed with the first HARQ-ACK, transmitting the first HARQ-ACK or transmitting the first HARQ-ACK and the second HARQ-ACK.

In the embodiment of the present disclosure, through the above steps, the bit number of the second HARQ-ACK transmitted simultaneously with the first HARQ-ACK can be determined according to the first indication field of the first DCI, thereby receiving HARQ-ACK, so that the network device can receive corresponding HARQ-ACK according to the first indication field of the first DCI, thereby ensuring that the terminal and the network device have the same understanding of the bit number of the HARQ-ACK transmitted by the terminal.

As an optional implementation manner, in case that the second HARQ-ACK uses a dynamic HARQ-ACK codebook, each indication state of the first indication field indicates a corresponding type of information used to determine the total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the first indication state indicates a corresponding type of information used to determine the total bit number of the second HARQ-ACK, where the total bit number is greater than 0; or, under a first condition, a second indication state of the first indication field is used to, indicate a type of information for determining a total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information used to determine the total bit number of the second HARQ-ACK, where the total bit number is greater than 0.

The foregoing information for determining the total bit number of the second HARQ-ACK may determine that the total bit number of the second HARQ-ACK is 0 or greater than 0.

Each indication state of the first indication field indicating a corresponding type of information used to determine the total bit number of the second HARQ-ACK may be that the first indication field may determine a total bit number of different second HARQ-ACKs through different indication states. Of course, in some embodiments, some indication states are allowed to be corresponding to the total bit number of the same second HARQ-ACK. For example, the first indication field has 3-bit indication information which can indicate 8 indication states, but possible total bit numbers of the second HARQ-ACK are 1-7, then among the 8 indication states, there may be 2 indication states corresponding to the total bit number of the same second HARQ-ACK, or one of the 8 indication states is reserved. In some embodiments, one indication state is allowed to be corresponding to the total bit numbers of multiple second HARQ-ACKs. For example, the first indication field has 2-bit indication information which can indicate 4 indication states, but possible total bit numbers of the second HARQ-ACK are 0-4, then one of the four indication states may be corresponding to two total bit numbers, including 0 bits and 4 bits, and whether the indication state actually indicates 0 bits or 4 bits can be determined by the number of actually received downlink transmissions corresponding to the second HARQ-ACK. For example, if no downlink transmission corresponding to the second HARQ-ACK is received, it is determined that the indication state indicates 0 bits; if at least one downlink transmission corresponding to the second HARQ-ACK is received, it is determined that the indication state indicates 4 bits.

The above first indication state may be an indication state defined by the protocol or configured by the network side. The first indication state may indicate that the second HARQ-ACK does not exist, or indicate that the second HARQ-ACK is not multiplexed with the first HARQ-ACK, or indicate that the total bit number of the second HARQ-ACK is 0, or indicate that the total number of downlink transmissions corresponding to the second HARQ-ACK is 0. Other indication states are respectively corresponding to a type of information used to determine the total bit number, which is greater than 0, of the second HARQ-ACK.

The above second indication state may be an indication state defined by the protocol or configured by the network side. The above first condition and second condition are defined by the protocol or configured by the network side. Different contents can be indicated by the above second indication state under different conditions, thereby reducing the overhead of DCI.

In addition, in case that the first indication field indicates that the second HARQ-ACK is not multiplexed with the first HARQ-ACK, or indicates that the bit number of the second HARQ-ACK is 0, or indicates that the second HARQ-ACK does not exists, if the second HARQ-ACK actually exists and the second HARQ-ACK and the first HARQ-ACK overlap in the time domain, the second HARQ-ACK may be discarded.

Optionally, the information for determining the total bit number of the second HARQ-ACK includes:

a total bit number of the second HARQ-ACK, or a total number of downlink transmissions corresponding to the second HARQ-ACK.

The total bit number of the second HARQ-ACK may be 0 or greater than 0. The total number of downlink transmissions corresponding to the second HARQ-ACK may include a total number of transmissions of PDSCH or SPS PDSCH release corresponding to the second HARQ-ACK, that is, a total number of PDCCHs that schedule PDSCH or PDCCHs that indicate SPS PDSCH release. Alternatively, the total number of downlink transmissions corresponding to the second HARQ-ACK may include a total number of {serving cell, PDCCH monitoring occasion}-pair(s) with PDSCH or SPS PDSCH release, where PDSCH and SPS PDSCH release are corresponding to the second HARQ-ACK. In addition, the total number of the above PDCCH for scheduling PDSCH and PDCCH indicating SPS PDSCH release may also be referred to as the number of downlink transmissions (including PDSCH, SPS PDSCH release) for which the second HARQ-ACK feedback (including two kinds of feedback information of ACK and NACK) are required.

For example, in case that the second HARQ-ACK uses a dynamic HARQ-ACK codebook, each indication state of the first indication field indicates a total bit number of a dynamic HARQ-ACK codebook of a second HARQ-ACK corresponding to the each indication state, where the total bit number includes 0 or an integer greater than 0; or, a first indication state of the first indication field may be used to indicate that the second HARQ-ACK does not exist, or the second HARQ-ACK is not multiplexed with the first HARQ-ACK, or the total bit number of the second HARQ-ACK is 0; and each indication state in the first indication field except for the first indication state may indicate a total bit number, which is greater than 0, of a dynamic HARQ-ACK codebook of a second HARQ-ACK corresponding to the each indication state; or, under a first condition, a second indication state of the first indication field is used to, a total bit number of a dynamic HARQ-ACK codebook of a second HARQ-ACK; under a second condition, the second indication state is used to indicate that the second HARQ-ACK does not exist, or indicate that the second HARQ-ACK is not multiplexed with the first HARQ-ACK, or indicate that the total bit number of the second HARQ-ACK is 0; and each indication state in the first indication field except for the second indication state may indicate a total bit number, which is greater than 0, of a dynamic HARQ-ACK codebook of a second HARQ-ACK corresponding to the each indication state; or, each indication state of the first indication field may indicate a total number of downlink transmissions corresponding to a second HARQ-ACK corresponding to the each indication state, where the total number of downlink transmissions may be used to determine the total bit number of the HARQ-ACK codebook corresponding to the second HARQ-ACK, and the total number includes 0 or greater than 0; or, the first indication state of the first indication field may be used to indicate that the second HARQ-ACK does not exist, or indicate that the second HARQ-ACK is not multiplexed with the first HARQ-ACK, or indicate that a total number of downlink transmissions corresponding to the second HARQ-ACK is 0; and each indication state in the first indication field except for the first indication state indicates a total number, which is greater than 0, of downlink transmissions corresponding to a second HARQ-ACK corresponding to the each indication state, where the total number of downlink transmissions may be used to determine the total bit number of the HARQ-ACK codebook corresponding to the second HARQ-ACK; or, the second indication state of the first indication field may indicate, under the first condition, a total number of downlink transmissions, which is greater than 0, corresponding to a second HARQ-ACK; under the second condition, the second indication state is used to indicate that the second HARQ-ACK does not exist, or the second HARQ-ACK is not multiplexed with the first HARQ-ACK, or the total number of downlink transmissions corresponding to the second HARQ-ACK is 0; and each indication state in the first indication field except for the second indication state indicates a total number, which is greater than 0, of downlink transmissions corresponding to a second HARQ-ACK corresponding to the each indication state, where the total number of downlink transmissions may be used to determine the total bit number of the HARQ-ACK codebook corresponding to the second HARQ-ACK.

As an optional implementation manner, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining the bit number of a sub-codebook corresponding to the each sub-indication field of the second HARQ-ACK.

The above information for determining the total bit number of the second HARQ-ACK may be the total bit number of the sub-codebooks of the second HARQ-ACK, or the total number of downlink transmissions corresponding to the sub-codebooks of the second HARQ-ACK.

In this embodiment, each sub-indication field may indicate information of the bit number of a sub-codebook. For example, if the HARQ-ACK codebook of the second HARQ-ACK includes multiple sub-codebooks, the first indication field includes multiple T-DAI fields, which respectively indicate information used to determine the total bit number of each sub-codebook. For example, the first indication field is 4 bits, the first 2 bits of the 4 bits are T-DAI field corresponding to a first sub-codebook, which is used to indicate information for determining the total bit number of the first sub-codebook; and the last 2 bits of the 4 bits are a T-DAI field corresponding to a second sub-codebook, which is used to indicate information for determining the total bit number of the second sub-codebook. In particular, in case of a single carrier, there may be no T-DAI field and there is only C-DAI field. At this point, because there is no accumulation of numbers between carriers, physical meaning of the C-DAI field is equivalent to the T-DAI field, and the C-DAI field may also be used to determine the total bit number of a dynamic HARQ-ACK codebook or sub-codebook, then the first indication field may be expressed as a C-DAI field. In case that the first HARQ-ACK also uses a dynamic HARQ-ACK codebook, the first DCI further includes T-DAI and C-DAI (or C-DAI only) for determining a size of the dynamic HARQ-ACK codebook of the first HARQ-ACK, and these fields are different indication fields from the first indication field (corresponding to T-DAI and C-DAI (or only C-DAI) of the second HARQ-ACK) in the first DCI.

Optionally, the first condition includes:

there is a downlink transmission corresponding to the second HARQ-ACK; or there is a downlink transmission with DCI scheduling corresponding to the second HARQ-ACK; or, there is overlap in the time domain between the first uplink channel and the second uplink channel, where the second uplink channel is a channel carrying the second HARQ-ACK.

The overlap in the time domain between the first uplink channel and the second uplink channel may be that the first uplink channel and the second uplink channel completely or partially overlap in the time domain.

Optionally, the second condition includes:

there is no downlink transmission corresponding to the second HARQ-ACK; or, there is no downlink transmission with DCI scheduling corresponding to the second HARQ-ACK; or, there is no overlap in the time domain between the first uplink channel and the second uplink channel, where the second uplink channel is a channel carrying the second HARQ-ACK.

The non-overlap in the time domain between the first uplink channel and the second uplink channel may be that there is no time-domain resource overlapping between the first uplink channel and the second uplink channel in the time domain.

As an optional implementation manner, in case that the second HARQ-ACK uses a semi-static HARQ-ACK codebook, the first indication field at least includes a third indication state and a fourth indication state; where the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; where the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to a size of the semi-static HARQ-ACK codebook; or, the first indication field at least includes a seventh indication state and an eighth indication state; where the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to a size of the semi-static HARQ-ACK codebook; or, the seventh indication state is used to indicate that the bit number of the second HARQ-ACK is 1 bit, or indicate that the bit number of the second HARQ-ACK is determined according to a fallback mode; the eighth indication state is used to, under a first condition, indicate that the bit number of the second HARQ-ACK is determined according to a size of the semi-static HARQ-ACK codebook; under a second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; where the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to a size of the semi-static HARQ-ACK codebook.

The above third to eleventh indication states may be defined by the protocol or configured by the network. In addition, in the above four implementation manners, the indication states may be multiplexed, for example, the third indication state may be the same as the fifth indication state or the seventh indication state, and the fourth indication state may be the same as the sixth indication state or the eighth indication state.

The above determining the bit number of the second HARQ-ACK according to the fallback mode may include: determining that the bit number of the second HARQ-ACK is 1. For example, the fallback mode may be defined as: only 1-bit second HARQ-ACK is fed back when the following conditions are met: when only one or more SPS PDSCHs are received, and if multiple SPS PDSCHs are received, only one SPS PDSCH requires HARQ-ACK feedback; or, when only one SPS PDSCH release transmitted using DCI format 1-0 is received, and a C-DAI value in DCI is 1; or, when only one PDSCH scheduled using DCI format 1-0 is received, and a C-DAI value in DCI is 1.

It is to be noted that, in this embodiment of the present disclosure, the above first indication field may further include other indication states in addition to the above first to eleventh indication states, which may be specifically defined according to requirements.

Optionally, in case that each indication state of the first indication field indicates a corresponding type of information for determining the total bit number of the second HARQ-ACK, if it is determined that there is overlap in the time domain between the second uplink channel that does not carry the second HARQ-ACK and the first uplink channel, indication information in the first indication field is ignored. That is, at this point, the terminal may not parse or read the indication information in the first indication field; or, regardless of contents of the indication information in the first indication field, the terminal does not receive HARQ-ACK according to the first indication field, and the terminal always assumes that there is no second HARQ-ACK and only transmits the first HARQ-ACK.

The overlap in the time domain between the second uplink channel that does not carry the second HARQ-ACK and the first uplink channel may be that, for the terminal, there is currently no uplink channel which carries the second HARQ-ACK and which overlaps with the first uplink channel in the time domain.

Optionally, in case that the first indication field includes the third indication state and the fourth indication state, if it is determined that there is overlap in the time domain between the second uplink channel that does not carry the second HARQ-ACK and the first uplink channel, ignoring indication information in the first indication field. That is, at this point, the terminal may not parse or read the indication information in the first indication field; or, regardless of contents of the indication information in the first indication field, the terminal does not receive HARQ-ACK according to the first indication field, and the terminal always assumes that there is no second HARQ-ACK and only transmits the first HARQ-ACK.

As an optional implementation manner, the terminal receiving HARQ-ACK according to the first indication field, includes:

determining, by the terminal, the bit number of the second HARQ-ACK according to the first indication field;

transmitting, by the terminal, HARQ-ACK according to the bit number of the second HARQ-ACK.

The determining, by the terminal, the bit number of the second HARQ-ACK according to the first indication field, may include: determining the bit number of the second HARQ-ACK according to an indication state of the first indication field. For example, according to information for determining the total bit number of the second HARQ-ACK, which is indicated by the indication state of the indication field, the bit number of the second HARQ-ACK is determined. Alternatively, according to whether the second HARQ-ACK exists or whether the second HARQ-ACK is multiplexed with the first HARQ-ACK, which is indicated by the first indication field, whether the bit number of the second HARQ-ACK is 0, is determined.

As an optional implementation manner, the determining, by the terminal, the bit number of the second HARQ-ACK according to the first indication field, may be performed only when it is determined that the first HARQ-ACK and the second HARQ-ACK need to be simultaneously transmitted on the same channel. For example, the determining, by the terminal, the bit number of the second HARQ-ACK according to the first indication field, includes:

in case that there is overlap in the time domain between the first uplink channel carrying the first HARQ-ACK and the second uplink channel carrying the second HARQ-ACK, determining, by the terminal, the bit number of the second HARQ-ACK according to the first indication field.

In this embodiment, since the terminal receives HARQ-ACK according to the bit number of the second HARQ-ACK determined according to the first indication field, the network device can receive HARQ-ACK according to the same bit number of the second HARQ-ACK, thereby ensuring that the terminal and the network device have the same understanding of the bit number of the second HARQ-ACK.

Optionally, the transmitting, by the terminal, HARQ-ACK according to the bit number of the second HARQ-ACK, includes:

according to the bit number of the second HARQ-ACK, simultaneously transmitting the first HARQ-ACK and the second HARQ-ACK on the same channel; or, in case that the bit number of the second HARQ-ACK is greater than 0 or it is determined to transmit the second HARQ-ACK, simultaneously transmitting the first HARQ-ACK and the second HARQ-ACK on the same channel, according to the bit number of the second HARQ-ACK; in case that the bit number of the second HARQ-ACK is 0 or it is determined to not transmit the second HARQ-ACK, transmitting the first HARQ-ACK on the first uplink channel.

The above determination to transmit the second HARQ-ACK may include: according to the first indication field, determining that the bit number of the second HARQ-ACK is greater than 0, or determining that the second HARQ-ACK exists or determining that the second HARQ-ACK is allowed to be multiplexed with the first HARQ-ACK. The above determination to not transmit the second HARQ-ACK may include: according to the first indication field, determining that the bit number of the second HARQ-ACK is 0, or determining that the second HARQ-ACK does not exist or determining that the second HARQ-ACK is not multiplexed with the first HARQ-ACK.

The simultaneously transmitting the first HARQ-ACK and the second HARQ-ACK on the same channel, according to the bit number of the second HARQ-ACK, may be that the bit number of the second HARQ-ACK transmitted on this channel is the above bit number of the second HARQ-ACK determined according to the first indication field, and the bit number of the first HARQ-ACK may be the bit number determined according to HARQ-ACK codebook type configured by the network side, actual reception situation and related configuration parameters in the related art, in accordance with a method specified in the protocol; or the bit number of the first HARQ-ACK may be the bit number determined in a pre-negotiation manner between the terminal and the network device. In the embodiments of the present disclosure, the bit number of the first HARQ-ACK is not limited, and it is assumed that the network side and the terminal can always have the same understanding of the bit number of the first HARQ-ACK.

The simultaneously transmitting the first HARQ-ACK and the second HARQ-ACK on the same channel may include: simultaneously transmitting the first HARQ-ACK and the second HARQ-ACK on the first uplink channel or the second uplink channel. The second uplink channel may be a channel different from the first uplink channel, and may be PUCCH corresponding to the first HARQ-ACK or an uplink channel with the same priority as the first uplink channel or the first HARQ-ACK.

The simultaneously transmitting the first HARQ-ACK and the second HARQ-ACK on the same channel, according to the bit number of the second HARQ-ACK, may include: taking the above bit number of the second HARQ-ACK determined according to the first indication field as a reference bit number, and simultaneously transmitting the first HARQ-ACK and the second HARQ-ACK on the same channel according to the reference bit number, which specifically includes:

in case that the uplink channel on which the first HARQ-ACK and the second HARQ-ACK are simultaneously transmitted is PUCCH, determining PUCCH resource based on at least the reference bit number, and simultaneously transmitting the first HARQ-ACK and the second HARQ-ACK on the PUCCH resource; or, in case that the uplink channel on which the first HARQ-ACK and the second HARQ-ACK are simultaneously transmitted is PUSCH, determining a target resource for carrying HARQ-ACK on the PUSCH based on at least the reference bit number, and simultaneously transmitting the first HARQ-ACK and the second HARQ-ACK on the target resource.

The determining PUCCH resource includes at least one of the following:

determining a PUCCH resource set;

determining a minimum number of resource blocks (RBs) of a PUCCH resource for carrying the first HARQ-ACK and the second HARQ-ACK; or, determining one PUCCH resource in at least one PUCCH resource for carrying channel state information (CSI), where the PUCCH resource for carrying CSI is a PUCCH resource used for carrying multiple CSI.

The determining PUCCH resource set includes:

according to a sum of the bit number of the first HARQ-ACK and the reference bit number of the second HARQ-ACK, determining the PUCCH resource set.

The determining a minimum number of resource blocks (RBs) of a PUCCH resource for carrying the first HARQ-ACK and the second HARQ-ACK, includes:

according to a sum of the bit number of the first HARQ-ACK and the reference bit number of the second HARQ-ACK, determining the minimum number of resource blocks (RBs) of a PUCCH resource for carrying the first HARQ-ACK and the second HARQ-ACK; or, determining a first minimum number of RBs for carrying the first HARQ-ACK according to the bit number of the first HARQ-ACK, determining a second minimum number of RBs for carrying the second HARQ-ACK according to the reference bit number of the second HARQ-ACK, and taking a sum of the first minimum number of RBs and the second minimum number of RBs as the minimum number of RBs of the PUCCH resource for carrying the first HARQ-ACK and the second HARQ-ACK.

The determining one PUCCH resource in at least one PUCCH resource for carrying channel state information (CSI), includes:

according to a sum of the bit number of the first HARQ-ACK, the reference bit number of the second HARQ-ACK and the bit number of CSI simultaneously transmitted with the first HARQ-ACK and the second HARQ-ACK, selecting a PUCCH resource from at least one PUCCH resource for carrying CSI.

The simultaneously transmitting the first HARQ-ACK and the second HARQ-ACK on the same channel, according to the reference bit number, further includes:

in case that CSI and HARQ-ACK are transmitted simultaneously, at least based on the reference bit number of the second HARQ-ACK, determining whether to perform CSI discarding and/or discarding part of CSI.

Specifically, based on the reference bit number of the first HARQ-ACK and the second HARQ-ACK, whether to perform CSI discarding and/or discarding part of CSI, is determined.

Specifically, if it is determined to not discard CSI, then the CSI, the second HARQ-ACK and the first HARQ-ACK are directly transmitted simultaneously on the same uplink channel; if it is determined to discard CSI, it is further determined which part of the CSI is reserved and which part of the CSI is discarded, and the reserved part of the CSI, the second HARQ-ACK and the first HARQ-ACK are simultaneously transmitted on the same uplink channel.

The determining a target resource for carrying HARQ-ACK on the PUSCH based on the reference bit number, includes:

according to the sum of the bit number of the first HARQ-ACK and the reference bit number of the second HARQ-ACK, determining the target resource for carrying the first HARQ-ACK and the second HARQ-ACK on the PUSCH; or, determining a first resource for carrying the first HARQ-ACK on the PUSCH according to the bit number of the first HARQ-ACK, and determining a second resource for carrying the second HARQ-ACK on the PUSCH according to the reference bit number of the second HARQ-ACK; where the target resource includes the first resource and the second resource.

The simultaneously transmitting the first HARQ-ACK and the second HARQ-ACK on the same channel according to the reference bit number, includes:

in case that the first HARQ-ACK and the second HARQ-ACK are transmitted by using joint coding, transmitting the second HARQ-ACK according to the reference bit number; or, in case that the first HARQ-ACK and the second HARQ-ACK are transmitted by using independent coding, transmitting the second HARQ-ACK according to the reference bit number, or, transmitting the second HARQ-ACK according to an actual bit number (which is a bit number determined according to downlink reception situation corresponding to the second HARQ-ACK and HARQ-ACK).

In case of transmitting the second HARQ-ACK according to the reference bit number, a negative acknowledgment NACK bit is added at an end of an actual bit sequence of the second HARQ-ACK to obtain a target bit sequence, and a bit number of the target bit sequence is taken as the reference bit number.

As an optional implementation manner, the priority of the first uplink channel is higher than the priority of the second uplink channel carrying the second HARQ-ACK.

In this embodiment, the second HARQ-ACK with lower priority can be multiplexed with the first HARQ-ACK with higher priority.

As an optional implementation manner, the first uplink channel is one of PUCCH and PUSCH, the second uplink channel carrying the second HARQ-ACK is one of PUCCH and PUSCH, and channel types of the first uplink channel and the second uplink channel are the same or different.

In this embodiment, since the first uplink channel and the second uplink channel may be PUCCH or PUSCH and the channel types of the first uplink channel and the second uplink channel are the same or different, it can be realized that HARQ-ACKs carried on uplink channels of same or different types can be multiplexed.

As an optional implementation manner, whether the first indication field exists in the first DCI is determined according to configuration of high-layer signaling; or, the first indication field always exists in the first DCI by default.

In this embodiment, the terminal may determine whether the first indication field is in the first DCI according to high-layer signaling, so that when it is determined that the first indication field exists in the first DCI, DCI is detected according to a size of DCI in which the first indication field exists. The high-layer signaling may explicitly or implicitly indicate whether the first indication field exists in the first DCI. For example, the high-layer signaling directly informs whether the first indication field exists in the first DCI; or, the high-layer signaling may inform whether to support multiplexing transmission of channels with different priorities, if supporting multiplexing transmission of channels with different priorities, it means that the first DCI includes the first indication field; or, the high-layer signaling may inform whether to support multiplexing transmission of the first HARQ-ACK and the second HARQ-ACK, and when configuring to support multiplexing transmission of the first HARQ-ACK and the second HARQ-ACK, it is determined that the first indication field exists in the first DCI.

The foregoing defaulting that the first indication field always exists in the first DCI may mean that the terminal and the network device consider that the first indication field always exists in the first DCI. Whether to support multiplexing transmission of the first HARQ-ACK and the second HARQ-ACK can be dynamically determined through an indication state of the first indication field. For example, when the indication state of the first indication field indicates that there is no transmission of second HARQ-ACK or the second HARQ-ACK is not multiplexed with the first HARQ-ACK, it means that the multiplexing transmission of the first HARQ-ACK and the second HARQ-ACK is not supported, or it means that the second HARQ-ACK is scheduled, or it means that the second uplink channel does not overlap with the first uplink channel.

As an optional implementation manner, in case that the first uplink channel is PUCCH, the first DCI is a DCI used to schedule PDSCH that requires HARQ-ACK feedback on the PUCCH, or, the first DCI is a DCI used to indicate SPS PDSCH release that requires HARQ-ACK feedback on the PUCCH; or, in case that the first uplink channel is PUSCH, the first DCI is a DCI for scheduling the PUSCH.

The above first DCI being a DCI used to schedule PDSCH that requires HARQ-ACK feedback on the PUCCH, may be understood as that the first DCI is used to schedule PDSCH, and the PDSCH is a PDSCH that requires HARQ-ACK feedback on the PUCCH. The above first DCI being a DCI used to indicate SPS PDSCH release that requires HARQ-ACK feedback on the PUCCH, may be understood as that the first DCI is used to indicate the SPS PDSCH release, and the SPS PDSCH release is a SPS PDSCH release that requires HARQ-ACK feedback on the PUCCH.

As an optional implementation manner, in case that there are multiple first DCIs, values of first indication fields in the multiple first DCIs are the same, or the terminal transmits HARQ-ACK according to a first indication field in the last DCI.

For example, in case that there are multiple DCIs corresponding to the above first uplink channel, values of the first indication fields of the multiple DCIs are the same, and the terminal can receive HARQ-ACK according to the first indication field of any DCI.

For example, in case that there are multiple DCIs corresponding to the above first uplink channel, the terminal receives HARQ-ACK only according to the first indication field in the last DCI.

As an optional implementation manner, the priority of the first HARQ-ACK is higher than the priority of the second HARQ-ACK; or the first HARQ-ACK is HARQ-ACK of a unicast, and the second HARQ-ACK is HARQ-ACK of a multicast.

In this embodiment, HARQ-ACKs of different priorities can be multiplexed, and HARQ-ACK of the unicast and HARQ-ACK of the multicast can also be multiplexed.

It is to be noted that overlap in the time domain mentioned in the present disclosure generally refers to overlap in the time domain in the same carrier group, for example, in the same PUCCH carrier group in case of carrier aggregation (CA), or in the same master carrier group (MCG) or the same secondary carrier group (SCG) in case of dual connectivity (DC), or in the same PUCCH carrier group in a certain carrier group (MCG or SCG) in case of a combination of CA and DC; and the above carriers can be replaced by cells, which are equivalent to carriers.

In this embodiment of the present disclosure, the terminal receives the first downlink control information DCI, and the first indication field of the first DCI is used to determine at least one of the following: the bit number of the second HARQ-ACK, whether the second HARQ-ACK exists, or whether the second HARQ-ACK is multiplexed with the first HARQ-ACK; and the terminal receives HARQ-ACK according to the first indication field; where the first DCI is a DCI corresponding to the first uplink channel carrying the first HARQ-ACK, and the second HARQ-ACK is HARQ-ACK multiplexed with the first HARQ-ACK. In this way, since the terminal receives HARQ-ACK according to the first indication field, it can be avoided that when multiple HARQ-ACKs are simultaneously transmitted, the terminal and the network device have inconsistent understanding of the bit numbers of HARQ-ACKs transmitted by the terminal.

Figure 5:
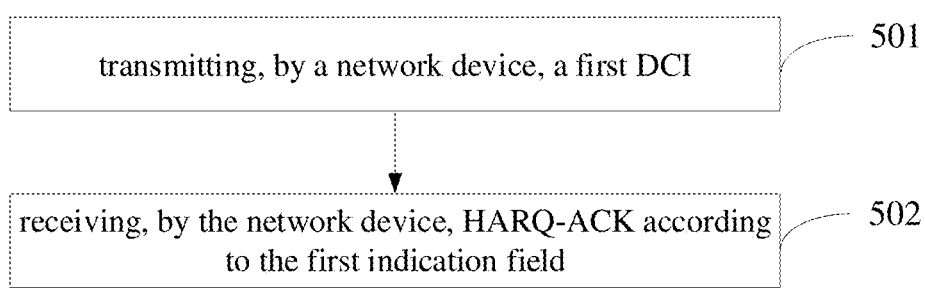
FIG. 5 is a flowchart of an uplink control information reception method according to an embodiment of the present disclosure.

Referring to FIG. 5, FIG. 5 is a flowchart of an uplink control information reception method according to an embodiment of the present disclosure. As shown in FIG. 5, the method includes the following steps:

Step 501: transmitting, by a network device, a first downlink control information DCI, where a first indication field of the first DCI is used to determine at least one of the following: a bit number of a second HARQ-ACK, whether the second HARQ-ACK exists, whether the second HARQ-ACK is multiplexed with a first HARQ-ACK;

Step 502: receiving, by the network device, HARQ-ACK according to the first indication field.

The first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates a corresponding type of information used to determine the total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the first indication state indicates a corresponding type of information used to determine the total bit number of the second HARQ-ACK, where the total bit number is greater than 0; or, under a first condition, a second indication state of the first indication field is used to, indicate a type of information for determining a total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information used to determine the total bit number of the second HARQ-ACK, where the total bit number is greater than 0.

Optionally, the information for determining the total bit number of the second HARQ-ACK includes:

a total bit number of the second HARQ-ACK, or a total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining the bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; where the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; where the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to a size of the semi-static HARQ-ACK codebook; or, the first indication field at least includes a seventh indication state and an eighth indication state; where the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to a size of the semi-static HARQ-ACK codebook; or, the seventh indication state is used to indicate that the bit number of the second HARQ-ACK is 1 bit, or indicate that the bit number of the second HARQ-ACK is determined according to a fallback mode; the eighth indication state is used to, under a first condition, indicate that the bit number of the second HARQ-ACK is determined according to a size of the semi-static HARQ-ACK codebook; under a second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; where the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to a size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in the time domain between the first uplink channel and the second uplink channel, where the second uplink channel is a channel carrying the second HARQ-ACK.

The second condition includes:

there is no downlink transmission corresponding to the second HARQ-ACK; or, there is no downlink transmission with DCI scheduling corresponding to the second HARQ-ACK; or, there is no overlap in the time domain between the first uplink channel and the second uplink channel, where the second uplink channel is a channel carrying the second HARQ-ACK.

Optionally, in case that each indication state of the first indication field indicates a corresponding type of information for determining the total bit number of the second HARQ-ACK, if it is determined that there is overlap in the time domain between the second uplink channel that does not carry the second HARQ-ACK and the first uplink channel, indication information in the first indication field can be arbitrarily set.

Optionally, in case that the first indication field includes the third indication state and the fourth indication state, if it is determined that there is overlap in the time domain between the second uplink channel that does not carry the second HARQ-ACK and the first uplink channel, indication information in the first indication field can be arbitrarily set.

Optionally, the receiving, by the network device, HARQ-ACK according to the first indication field, includes:

determining, by the network device, a bit number of the second HARQ-ACK, according to the first indication field;

receiving, by the network device, HARQ-ACK according to the bit number of the second HARQ-ACK.

Optionally, the receiving, by the network device, HARQ-ACK according to the bit number of the second HARQ-ACK, includes:

according to the bit number of the second HARQ-ACK, simultaneously receiving the first HARQ-ACK and the second HARQ-ACK on the same channel; or, in case that the bit number of the second HARQ-ACK is greater than 0 or it is determined to transmit the second HARQ-ACK, simultaneously receiving the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, receiving the first HARQ-ACK on the first uplink channel.

Optionally, the determining, by the network device, a bit number of the second HARQ-ACK, according to the first indication field, includes:

in case that there is overlap in the time domain between the first uplink channel carrying the first HARQ-ACK and the second uplink channel carrying the second HARQ-ACK, determining, by the network device, the bit number of the second HARQ-ACK, according to the first indication field.

Optionally, the priority of the first uplink channel is higher than the priority of the second uplink channel carrying the second HARQ-ACK.

Optionally, the first uplink channel is one of PUCCH and PUSCH, the second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is a DCI used to schedule PDSCH that requires HARQ-ACK feedback on the PUCCH, or, the first DCI is a DCI used to indicate SPS PDSCH release that requires HARQ-ACK feedback on the PUCCH; or, in case that the first uplink channel is PUCCH, the first DCI is a DCI for scheduling the PUSCH.

Optionally, in case that there are multiple first DCIs, values of first indication fields in the multiple first DCIs are the same, or HARQ reception is performed according to a first indication field in the last DCI.

Optionally, the priority of the first HARQ-ACK is higher than the priority of the second HARQ-ACK; or the first HARQ-ACK is HARQ-ACK of a unicast, and the second HARQ-ACK is HARQ-ACK of a multicast.

Optionally, the first indication field is reuse of existing bits in the first DCI, or the first indication field is a newly added bit in the first DCI.

It is to be noted that this embodiment is an implementation manner of the corresponding network device in the embodiment shown in FIG. 4, and the specific implementation may refer to relevant description of the embodiment shown in FIG. 4 with the same beneficial effects being achieved, which will not be repeated in this embodiment to avoid repetition.

The methods provided by the embodiments of the present disclosure will be described hereinafter with specific examples.

Example 1

It is assumed that HARQ-ACK of lower priority (i.e., the above second HARQ-ACK) uses a dynamic codebook, and CBG transmission is not configured, that is, at least 2-bit T-DAI is required to indicate a total bit number of the low-priority dynamic codebook (if CBG is configured, 4-bit T-DAI is required, where the first 2 bits indicate T-DAI of a first sub-codebook, and the last 2 bits indicate T-DAI of a second sub-codebook, and a bit size of each sub-codebook is determined in a manner similar to the process in this embodiment which will not be repeated); high-priority HARQ-ACK (i.e., the above first HARQ-ACK) using any codebook can use the method in this embodiment (for example, high-priority HARQ-ACK only needs to determine high-priority HARQ-ACK feedback sequence based on the used codebook according to a method defined by the protocol); assuming that the terminal is used to support multiplexing transmission when low-priority and high-priority channels overlap or the terminal is used to support multiplexing transmission of HARQ-ACKs with different priorities, then it is determined that DCI corresponding to high-priority PUCCH (for example, DCI for scheduling PDSCH that requires HARQ-ACK feedback on the PUCCH, or, DCI for indicating SPS PDSCH release and the DCI for indicating SPS PDSCH release requires HARQ-ACK feedback on the PUCCH) includes a first indication field (which may be 2 bits or 3 bits according to different mapping tables). The network device transmits DCI according to a condition of including the first indicator field, and the terminal receives the DCI according to the condition of including the first indicator field. It is assumed that according to scheduling of the network device, on an active BWP on a primary carrier, transmission of low-priority PUCCH (LP PUCCH) and transmission of high-priority PUCCH (HP PUCCH) overlap in the time domain, and the two PUCCHs are used to carry HARQ-ACKs, the priorities of the two PUCCHs are determined according to priorities of HARQ-ACK codebooks carried by the two PUCCHs, and the priorities of HARQ-ACK codebooks may be dynamically indicated by a priority indication field in DCI for scheduling PDSCH.

Figure 6:
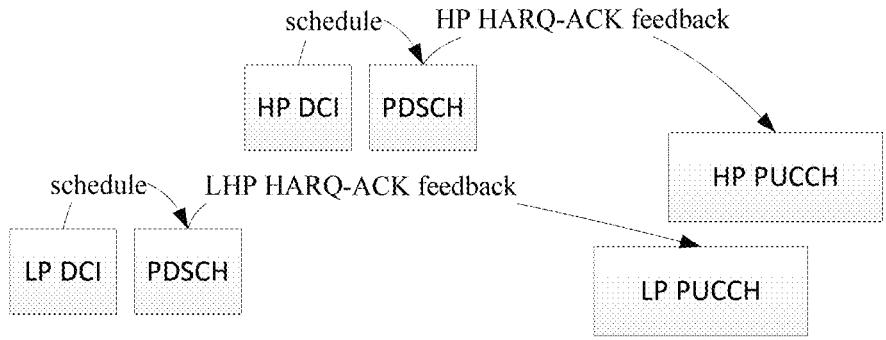
FIG. 6 is a schematic diagram showing transmission of uplink control information according to an embodiment of the present disclosure.

Specifically, as shown in FIG. 6, the network device may operate as follows.

It is assumed that the network device schedules 6 down-link transmissions (such as PDSCH or SPS PDSCH release) corresponding to low-priority HARQ-ACK, and each down-link transmission is corresponding to 1-bit HARQ-ACK, that is, the network device determines that low-priority PUCCH carries 6-bit low-priority HARQ-ACK, as shown in FIG. 3; the network device determines A-bit high-priority HARQ-ACK is transmitted in high-priority PUCCH, according to the number of downlink transmissions corresponding to high-priority HARQ-ACKs scheduled by the network device, a bit number of HARQ-ACK corresponding to each downlink transmission and a type (dynamic or semi-static) of high-priority HARQ-ACK codebook.

According to the following mapping table 1 in accordance with a mode 1 (each indication state of a first indication field indicates a corresponding type of information used to determine a total bit number of the second HARQ-ACK), or according to the following mapping table 4 in accordance with a mode 3 (i.e., implementation of the second indication state in the embodiment shown in FIG. 4), the network device sets a 2-bit first indication field in DCI (which is a DCI for scheduling PDSCH that that requires high-priority HARQ-ACK transmitted on high-priority PUCCH) corresponding to HP PUCCH to "01" and a value of corresponding $$V_{T-DAI}^{DL}$$

is "2"; or, according to the following mapping table 2 in accordance with a mode 2 (i.e., implementation of the first indication state in the embodiment shown in FIG. 4), the network device sets a 2-bit first indication field in DCI corresponding to HP PUCCH to "10" and a value of corresponding $$V_{T-DAI}^{DL}$$

is "2"; or, according to the following mapping table 3 in accordance with a mode 2 (i.e., implementation of the first indication state in the embodiment shown in FIG. 4), the network device sets a 3-bit first indication field in DCI corresponding to HP PUCCH to "011" and a value of corresponding $$V_{T-DAI}^{DL}$$

is "3", it means that there are 6 DCI transmissions corresponding to low priority for scheduling 6 PDSCH or SPS PDSCH release corresponding to low-priority HARQ-ACK, thereby helping the terminal determine that the bit number of low-priority HARQ-ACK is 6 bits (that is, the bit number of the second HARQ-ACK is 6).

The network device receives HARQ-ACK according to the A-bit high-priority HARQ-ACK and the 6-bit low-priority HARQ-ACK on a PUCCH resource which is determined according to a multiplexing transmission scheme of high-priority and low-priority HARQ-ACKs (the specific multiplexing transmission scheme is not limited, for example, the multiplexing transmission scheme may be defined in the protocol or newly defined in the subsequent protocol version), and obtains A-bit high-priority HARQ-ACK and 6-bit low-priority HARQ-ACK, respectively.

The terminal side may operate as follows.

For a low-priority situation, based on a scheduling situation shown in FIG. 3, assuming that the terminal has lost DCI in a last slot (slot n+3), then in the system of the related art, if the terminal determines low-priority HARQ-ACK according to T-DAI=1 in the last received DCI, it determines that it is 5 bits, which is inconsistent with that determined by the network device; while in the embodiment of the present disclosure, regardless of T-DAI in the last received DCI corresponding to low-priority HARQ-ACK, the terminal determines a bit number of the low-priority HARQ-ACK according to a first indication field in DCI corresponding to HP PUCCH (that is, indication of the first indication field is taken as a final T-DAI value, in case of a single carrier, indication of the first indication field is taken as a final C-DAI value). Specifically, according to the mapping table corresponding to the same mode adopted by the network device, the terminal can obtain a value of $$V_{T-DAI}^{DL}$$

indicated by the 2-bit first indication field as "2", or obtain a value of $$V_{T-DAI}^{DL}$$

indicated by the 3-bit first indication field as "3"; because more than 2 DCIs have been received, it is judged that a total number of transmitted DCIs indicated by $$V_{T-DAI}^{DL}$$

is 6 (which value among 2, 6, and 10 corresponds to the same indication state may be determined by combining how many DCIs have been received, because assuming that in multiplexing counting of the mode 4 and there is no continuous loss of 4 DCIs, then, if received DCI has exceeded 2 but not exceeded 6, it can be determined that the current first indication field indicates 6 DCIs); according to the number of downlink transmissions scheduled by DCI and a bit number of HARQ-ACK feedback corresponding to each downlink transmission, it is determined that the low-priority HARQ-ACK is of a total 6 bits (because there is packet loss in the last DCI, 1-bit NACK is added after 5-bit HARQ-ACK generated according to DAI value corresponding to the received DCI, thereby obtaining 6-bit feedback information). For a high-priority situation, the terminal determines A-bit high-priority HARQ-ACK is transmitted in high-priority PUCCH, according to the number of received downlink transmissions corresponding to high-priority HARQ-ACKs scheduled by the network device, a bit number of HARQ-ACK corresponding to each downlink transmission and a type (dynamic or semi-static) of high-priority HARQ-ACK codebook.

The terminal simultaneously transmits A-bit high-priority HARQ-ACK and 6-bit low-priority HARQ-ACK on a PUCCH resource which is determined according to a multiplexing transmission scheme of high-priority and low-priority HARQ-ACKs.

TABLE 1 correspondence of indication state of 2-bit
first indication field (corresponding to the above mode
1, where $T_D = 2^2 = 4$)

| first indication field MSB, LSB | $V_{T\text{-}DAI}^{DL}$ | total number of DCIs Y and Y ≥ 1 |
|---|---|---|
| 0, 0 | 1 | $(Y - 1)$ mod $T_D + 1 = 1$ (that is, corresponding to Y = 1, 5, 9 . . .) |
| 0, 1 | 2 | $(Y - 1)$ mod $T_D + 1 = 2$ (that is, corresponding to Y = 2, 6, 10 . . .) |
| 1, 0 | 3 | $(Y - 1)$ mod $T_D + 1 = 3$ (that is, corresponding to Y = 3, 7, 11 . . .) |
| 1, 1 | 4 | $(Y - 1)$ mod $T_D + 1 = 4$ (that is, corresponding to Y = 4, 8, 12 . . .) |

TABLE 2 correspondence of indication state of 2-bit first
indication field (corresponding to the above mode 2, where
$T_D = 2^2 - 1 = 3$)

| first indication field MSB, LSB | $V_{T\text{-}DAI}^{DL}$ | total number of DCIs Y and Y ≥ 1 |
|---|---|---|
| 0, 0 | 0 | no transmission of low-priority HARQ-ACK or low-priority HARQ-ACK not multiplexed with high-priority HARQ-ACK |
| 0, 1 | 1 | $(Y - 1)$ mod $T_D + 1 = 1$ (that is, corresponding to Y = 1, 4, 7 . . .) |
| 1, 0 | 2 | $(Y - 1)$ mod $T_D + 1 = 2$ (that is, corresponding to Y = 2, 5, 8 . . .) |
| 1, 1 | 3 | $(Y - 1)$ mod $T_D + 1 = 3$ (that is, corresponding to Y = 3, 6, 9 . . .) |

TABLE 3 correspondence of indication state of 3-bit first indication
field (corresponding to the above mode 2, where $T_D = 4$)

| first indication field MSB, LSB | $V_{T\text{-}DAI}^{DL}$ | total number of DCIs Y and Y ≥ 1 |
|---|---|---|
| 0, 0, 0 | 0 | no transmission of low-priority HARQ-ACK or low-priority HARQ-ACK not multiplexed with high-priority HARQ-ACK |
| 0, 0, 1 | 1 | $(Y - 1)$ mod $T_D + 1 = 1$ (that is, corresponding to Y = 1, 5, 9 . . .) |
| 0, 1, 0 | 2 | $(Y - 1)$ mod $T_D + 1 = 2$ (that is, corresponding to Y = 2, 6, 10 . . .) |
| 0, 1, 1 | 3 | $(Y - 1)$ mod $T_D + 1 = 3$ (that is, corresponding to Y = 3, 7, 11 . . .) |
| 1, 0, 0 | 4 | $(Y - 1)$ mod $T_D + 1 = 4$ (that is, corresponding to Y = 4, 8, 12 . . .) |
| reserved | reserved | |

TABLE 4 correspondence of indication state of 2-bit
first indication field (corresponding to the above mode
3, where $T_D = 2^2 = 4$)

| first indication field MSB, LSB | $V_{T\text{-}DAI}^{DL}$ | total number of DCIs Y and Y ≥ 1 |
|---|---|---|
| 0, 0 | 0 or 1 | $V_{T\text{-}DAI}^{DL} = 0$ means that no transmission of low-priority HARQ-ACK or low-priority HARQ-ACK not multiplexed with high-priority HARQ-ACK; |

TABLE 4-continued correspondence of indication state of 2-bit
first indication field (corresponding to the above mode
3, where $T_D = 2^2 = 4$)

| first indication field MSB, LSB | $V_{T\text{-}DAI}^{DL}$ | total number of DCIs Y and Y ≥ 1 |
|---|---|---|
| | | $V_{T\text{-}DAI}^{DL} = 1$ means that $(Y - 1)$ mod $T_D + 1 = 1$ (that is, corresponding to Y = 1, 5, 9 . . .) |
| 0, 1 | 2 | $(Y - 1)$ mod $T_D + 1 = 2$ (that is, corresponding to Y = 2, 6, 10 . . .) |
| 1, 0 | 3 | $(Y - 1)$ mod $T_D + 1 = 3$ (that is, corresponding to Y = 3, 7, 11 . . .) |
| 1, 1 | 4 | $(Y - 1)$ mod $T_D + 1 = 4$ (that is, corresponding to Y = 4, 8, 12 . . .) |

Example 2

It is assumed that on an active BWP on a primary carrier, there is no overlap in the time domain between high-priority PUCCH (HP PUCCH) carrying high-priority HARQ-ACK (i.e., the above first HARQ-ACK) and low-priority PUCCH (LP PUCCH) carrying low-priority HARQ-ACK (i.e., the above second HARQ-ACK) at a current moment (case 1: the network device schedules a low-priority transmission, but LP PUCCH carrying low-priority HARQ-ACK does not overlap with HP PUCCH in the time domain; case 2: the network device does not schedule low-priority transmissions, and thus there is no LP PUCCH). All the other assumptions are the same as that in the example 1, that is, the assumption of the high-priority and low-priority HARQ-ACK codebooks is the same as that in the example 1; and it is assumed that the terminal is used to support multiplexing transmission when low-priority and high-priority channels overlap or the terminal is used to support multiplexing transmission of HARQ-ACKs with different priorities, then it is determined that DCI corresponding to high-priority PUCCH (for example, DCI for scheduling PDSCH that requires HARQ-ACK feedback on the PUCCH, or, DCI for indicating SPS PDSCH release and the DCI for indicating SPS PDSCH release requires HARQ-ACK feedback on the PUCCH) includes a first indication field (which may be 2 bits or 3 bits according to different mapping tables). The network device transmits DCI according to a condition of including the first indicator field, and the terminal receives the DCI according to the condition of including the first indicator field.

Figure 7:
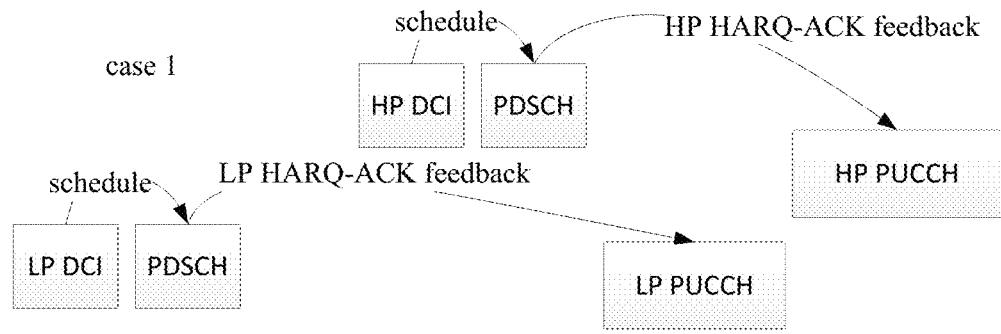
FIG. 7 is another schematic diagram showing transmission of uplink control information according to an embodiment of the present disclosure.
Figure 7:
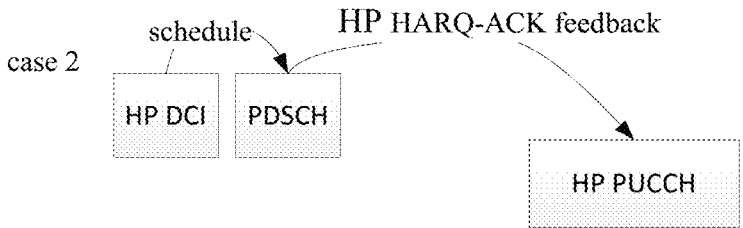

Specifically, as shown in FIG. 7, the network device may operate as follows.

For the above case 1, it is assumed that the network device schedules B downlink transmissions (such as PDSCH or SPS PDSCH release) corresponding to low-priority HARQ-ACK, and each downlink transmission is corresponding to 1-bit HARQ-ACK, that is, the network device determines that low-priority PUCCH carries B-bit low-priority HARQ-ACK. For the above case 2, it is assumed that the network device does not schedule low-priority transmissions, then there is no transmission of low-priority PUCCH carrying low-priority HARQ-ACK. For the case 1 and case 2, the network device determines A-bit high-priority HARQ-ACK is transmitted in high-priority PUCCH, according to the number of downlink transmissions corresponding to high-priority HARQ-ACKs scheduled by the network device, a bit number of HARQ-ACK corresponding to each downlink transmission and a type (dynamic or semi-static) of high-priority HARQ-ACK codebook.

For the above case 1 and case 2, there is no overlap between LP PUCCH and HP PUCCH; when using the mode 1 (each indication state of a first indication field indicates a corresponding type of information used to determine a total bit number of the second HARQ-ACK), it is considered that the first indication field in DCI corresponding to HP PUCCH does not work, that is, the network device may set the first indication field to a fixed value or an arbitrary value, and the terminal will not read this value or determine a bit number of low-priority HARQ-ACK according to this value. When using the mode 2 (implementation of the second indication state in the embodiment shown in FIG. 4), according to the following mapping table 2, or when using the mode 3 (implementation of the third indication state in the embodiment shown in FIG. 4), according to the following mapping table 4, a 2-bit first indication field in DCI corresponding to HP PUCCH is set to "00" and a value of corresponding $$V_{T-DAI}^{DL}$$

is "0"; or, according to the following mapping table 3 in accordance with the mode 2, a 3-bit first indication field in DCI corresponding to HP PUCCH is set to "000" and a value of corresponding $$V_{T-DAI}^{DL}$$

is "0", it means that there is no overlap between LP PUCCH and HP PUCCH, that is, no low-priority HARQ-ACK needs to be transmitted together with high-priority HARQ-ACK, thereby helping the terminal determine that a bit number of low-priority HARQ-ACK transmitted together with the high-priority HARQ-ACK is 0, that is, no low-priority HARQ-ACK needs to be transmitted together with the high-priority HARQ-ACK.

For the above case 1, the network device receives A-bit high-priority HARQ-ACK on HP PUCCH and receives B-bit low-priority HARQ-ACK on LP PUCCH, respectively. For the above case 2, the network device only receives A-bit high-priority HARQ-ACK on HP PUCCH.

The terminal side may operate as follows.

For the above case 1, since it is determined that there is no overlap in the time domain between LP PUCCH and HP PUCCH according to scheduling conditions of low priority and high priority respectively, there is no need to perform multiplexing transmission between low-priority HARQ-ACK and high-priority HARQ-ACK. For the above case 2, since no downlink transmission corresponding to low priority is received, it is determined that there is no LP PUCCH carrying low-priority HARQ-ACK, and thus there is no need to perform multiplexing transmission between low-priority HARQ-ACK and high-priority HARQ-ACK.

When using the above mode 1, according to the above judgment, it is determined that the first indication field in DCI corresponding to HP PUCCH does not work, and the terminal may not read this indication field or does not care about indication state of the indication field. When using the above mode 2 or the above mode 3, according to a value of $$V_{T-DAI}^{DL}$$

being "0" indicated by a 2-bit or 3-bit first indication field in a received DCI corresponding to HP PUCCH, it can be determined, according to a corresponding mapping table, that there is no multiplexing transmission of low-priority HARQ-ACK and high-priority HARQ-ACK at this moment, then, for the above case 1, the terminal determines that B-bit low-priority HARQ-ACK is transmitted in LP PUCCH, directly according to the number of received downlink transmissions corresponding to low-priority HARQ-ACK, a bit number of HARQ-ACK corresponding to each downlink transmission and a type (dynamic or semi-static) of low-priority HARQ-ACK codebook, and determines that A-bit high-priority HARQ-ACK is transmitted in HP PUCCH according to the number of received downlink transmissions corresponding to high-priority HARQ-ACK, a bit number of HARQ-ACK corresponding to each downlink transmission and a type (dynamic or semi-static) of high-priority HARQ-ACK codebook. The terminal transmits B-bit low-priority HARQ-ACK on LP PUCCH, and transmits A-bit high-priority HARQ-ACK on HP PUCCH, respectively. For the above case 2, the terminal determines that A-bit high-priority HARQ-ACK is transmitted in HP PUCCH (that is, there is no low-priority HARQ-ACK at this moment) according to the number of received downlink transmissions corresponding to high-priority HARQ-ACK, a bit number of HARQ-ACK corresponding to each downlink transmission and a type (dynamic or semi-static) of high-priority HARQ-ACK codebook, and transmits only the A-bit high-priority HARQ-ACK on HP PUCCH.

Example 3

It is assumed that low-priority HARQ-ACK uses a semi-static codebook type, and a first indication field included in DCI (that is, the above first DCI) corresponding to HP PUCCH is 1 or 2 bits, and other assumptions are the same as that in the example 1. Details are as follows.

The first indication field may be 1 bit, which is corresponding to a mode 4 (i.e., implementation of the third indication state and the fourth indication state in the embodiment shown in FIG. 4); the first indication field may be 2 bit, which is corresponding to a mode 5 (i.e., implementation of the fourth indication state and the fifth indication state in the embodiment shown in FIG. 4) and a mode 6 (i.e., implementation of the seventh indication state and the eighth indication state in the embodiment shown in FIG. 4).

For the semi-static codebook, the network device transmits 3 bits, the terminal receives 1 bit, and multiplexing transmission is performed according to A1 bit. In the above modes 4-6, if indication is generated according to the semi-static codebook, the 3 bits are transmitted together with AN bits.

The network device may operate as follows.

It is assumed that the network device schedules 3 downlink transmissions (such as PDSCH or SPS PDSCH release) corresponding to low-priority HARQ-ACK (i.e., the above second HARQ-ACK), and each downlink transmission is corresponding to 1-bit HARQ-ACK, as shown in FIG. 2, since fallback of the semi-static codebook is not satisfied (1-bit HARQ-ACK transmitted), the network device determines that low-priority HARQ-ACK carried in LP PUCCH is determined according to the semi-static codebook, i.e., determined according to the K1 set, and is 6-bit HARQ-ACK as shown in FIG. 2. The network device determines that A-bit high-priority HARQ-ACK is transmitted in high-priority PUCCH, according to the number of downlink transmissions corresponding to high-priority HARQ-ACKs (i.e., the above first HARQ-ACK) scheduled by the network device, a bit number of HARQ-ACK corresponding to each downlink transmission and a type (dynamic or semi-static) of high-priority HARQ-ACK codebook.

According to the following mapping table 5 in accordance with the above mode 4, or according to the following mapping table 6 in accordance with the above mode 5, the network device sets a 1-bit first indication field in DCI corresponding to HP PUCCH to "1"; or, according to the following mapping table 7 in accordance with the above mode 6, the network device sets a 1-bit first indication field in DCI corresponding to HP PUCCH to "0"; or, according to the following mapping table 8 in accordance with the above mode 7 (that is, implementation of the ninth indication state, the tenth indication state and the eleventh indication state in the embodiment shown in FIG. 4), the network device sets a 2-bit first indication field in DCI corresponding to HP PUCCH to "10", it means that a bit number of the low-priority HARQ-ACK is determined according to a size of the semi-static codebook, thereby helping the terminal determine that the bit number of the low-priority HARQ-ACK is 6 bits.

The network device receives HARQ-ACK according to the A-bit high-priority HARQ-ACK and the 6-bit low-priority HARQ-ACK on a PUCCH resource which is determined according to a multiplexing transmission scheme of high-priority and low-priority HARQ-ACKs, and obtains A-bit high-priority HARQ-ACK and 6-bit low-priority HARQ-ACK, respectively.

TABLE 5 correspondence of indication state of 1-bit first indication field (corresponding to the above mode 4)

| first indication field | bit number of low-priority HARQ-ACK |
| --- | --- |
| 0 | 1 |
| 1 | determined according to a size of the semi-static codebook |

TABLE 6 correspondence of indication state of 1-bit first indication field (corresponding to the above mode 5)

| first indication field | bit number of low-priority HARQ-ACK |
| --- | --- |
| 0 | 0 (no low-priority HARQ-ACK or not support multiplexing transmission of low-priority HARQ-ACK and high-priority HARQ-ACK) |
| 1 | determined according to a size of the semi-static codebook |

TABLE 7 correspondence of indication state of 1-bit first indication field (corresponding to the above mode 6)

| first indication field | bit number of low-priority HARQ-ACK |
| --- | --- |
| 0 | 0 (no low-priority HARQ-ACK or not support multiplexing transmission of low-priority HARQ-ACK and high-priority HARQ-ACK) or determined according to a size of the semi-static codebook |
| 1 | 1 |

TABLE 8 correspondence of indication state of 2-bit first indication field (corresponding to the above mode 7)

| first indication field | bit number of low-priority HARQ-ACK |
| --- | --- |
| 0, 0 | 0 (no low-priority HARQ-ACK or not support multiplexing transmission of low-priority HARQ-ACK and high-priority HARQ-ACK) |
| 0, 1 | 1 |
| 1, 0 | determined according to a size of the semi-static codebook |
| 1, 1 | (reserved status) |

The terminal side may operate as follows.

For a low-priority situation, based on a scheduling situation shown in FIG. 2, assuming that the terminal only receives the first DCI, and the first DCI is fallback DCI with DAI=1, then in the system of the related art, the terminal will consider it a semi-static codebook fallback method, and consider that the low-priority 1-bit HARQ-ACK is transmitted on LP PUCCH determined according to the first DCI, which is inconsistent with that determined by the network device; while in the embodiment of the present disclosure, regardless of how many DCIs corresponding to low-priority HARQ-ACK are received, the terminal determines a bit number of low-priority HARQ-ACK according to the first indication field in DCI corresponding to HP PUCCH. Specifically, according to the mapping table corresponding to the same mode adopted by the network device, it can be determined according to the 1-bit first indication field or the 2-bit first indication field that the bit number of low-priority HARQ-ACK is determined according to the size of the semi-static codebook. In particular, for the above mode 6, since 0 bit and determining the bit number according to the size of the semi-static codebook are both corresponding to the first indication field being in the state "0", the terminal judges, based on actually received DCI corresponding to the low-priority HARQ-ACK, that the first indication field being "0" indicates that the bit number of the low-priority HARQ-ACK is determined according to the size of the semi-static codebook. Then, the terminal determines that the low-priority HARQ-ACK has a total of 6 bits. For a high-priority situation, the terminal determines A-bit high-priority HARQ-ACK is transmitted in high-priority PUCCH, according to the number of received downlink transmissions corresponding to high-priority HARQ-ACKs, a bit number of HARQ-ACK corresponding to each downlink transmission and a type (dynamic or semi-static) of high-priority HARQ-ACK codebook.

The terminal simultaneously transmits A-bit high-priority HARQ-ACK and 6-bit low-priority HARQ-ACK on a PUCCH resource which is determined according to a multiplexing transmission scheme of high-priority and low-priority HARQ-ACKs.

Example 4

It is assumed that low-priority HARQ-ACK uses a semi-static codebook type, and a first indication field included in DCI corresponding to HP PUCCH is 1 or 2 bits, and other assumptions are the same as that in the example 2. Details are as follows.

For the semi-static codebook, the network device does not transmit LP AN, and a specific state in DCI indicates that there is no LP AN multiplexing, then only HP AN is transmitted. When using the above mode 5 or mode 6, it can be determined that there is no LP AN, according to the first indication field. When using the above mode 4, according to that the terminal does not receive any LP transmission, it is determined to ignore the first indication field and only HP AN is transmitted, or it is considered that there is no overlap and then it is not necessary to determine a bit number of LP AN according to the first indication field.

The network device may operate as follows.

Case 1: it is assumed that the network device schedules more than one downlink transmissions (such as PDSCH or SPS PDSCH release) corresponding to low-priority HARQ-ACK, and each downlink transmission is corresponding to 1-bit HARQ-ACK, that is, the network device determines that low-priority PUCCH carries B-bit low-priority HARQ-ACK (i.e., the above second HARQ-ACK) according to a determination method of the semi-static codebook. Or, case 2: it is assumed that the network device does not schedule low-priority transmissions, then there is no transmission of low-priority PUCCH carrying low-priority HARQ-ACK. For the case 1 and case 2, the network device determines that A-bit high-priority HARQ-ACK is transmitted in high-priority PUCCH, according to the number of downlink transmissions corresponding to high-priority HARQ-ACKs (i.e., the above first HARQ-ACK) scheduled by the network device, a bit number of HARQ-ACK corresponding to each downlink transmission and a type (dynamic or semi-static) of high-priority HARQ-ACK codebook.

For the above case 1 and case 2, there is no overlap between LP PUCCH and HP PUCCH; then, when using the above mode 4, it is considered that the first indication field in DCI corresponding to HP PUCCH does not work, that is, the network device may set the first indication field to a fixed value or an arbitrary value, and the terminal will not read this value or determine a bit number of low-priority HARQ-ACK according to this value. When using the above mode 5, according to the mapping table 6, or when using the above mode 6, according to the mapping table 7, a 1-bit first indication field in DCI corresponding to HP PUCCH is set to "0"; or, according to the mapping table 8 in accordance with the above mode 7, a 2-bit first indication field in DCI corresponding to HP PUCCH is set to "00", it means that there is no overlap between LP PUCCH and HP PUCCH, that is, no low-priority HARQ-ACK needs to be transmitted together with high-priority HARQ-ACK, thereby helping the terminal determine that a bit number of low-priority HARQ-ACK transmitted together with the high-priority HARQ-ACK is 0, that is, no low-priority HARQ-ACK needs to be transmitted together with the high-priority HARQ-ACK.

For the above case 1, the network device receives A-bit high-priority HARQ-ACK on HP PUCCH and receives B-bit low-priority HARQ-ACK on LP PUCCH, respectively. For the above case 2, the network device only receives A-bit high-priority HARQ-ACK on HP PUCCH.

The terminal side may operate as follows.

For the above case 1, since it is determined that there is no overlap in the time domain between LP PUCCH and HP PUCCH according to scheduling conditions of low priority and high priority respectively, there is no need to perform multiplexing transmission between low-priority HARQ-ACK and high-priority HARQ-ACK. For the above case 2, since no downlink transmission corresponding to low priority is received, it is determined that there is no LP PUCCH carrying low-priority HARQ-ACK, and thus there is no need to perform multiplexing transmission between low-priority HARQ-ACK and high-priority HARQ-ACK.

When using the above mode 4, according to the above judgment, it is determined that the first indication field in DCI corresponding to HP PUCCH does not work, and the terminal may not read this indication field or does not care about indication state of the indication field. When using the above mode 5 or the above mode 6 or the above mode 7, according to a value of a 1-bit or 2-bit first indication field in a received DCI corresponding to HP PUCCH, it can be determined, according to a corresponding mapping table, that there is no multiplexing transmission of low-priority HARQ-ACK and high-priority HARQ-ACK at this moment. In particular, for the above mode 6, in the above case 1, because the terminal has received multiple downlink transmissions corresponding to low-priority HARQ-ACK and a determined LP PUCCH resource does not overlap with the HP PUCCH, it is judged that "0" indicated by the first indication field at this time indicates that there is no multiplexing transmission of low-priority HARQ-ACK and high-priority HARQ-ACK. In the above case 2, since the terminal has not received any downlink transmission corresponding to low-priority HARQ-ACK, it is judged that "0" indicated by the first indication field at this time indicates that there is no multiplexing transmission of low-priority HARQ-ACK and high-priority HARQ-ACK. And then, for the above case 1, the terminal determines that B-bit low-priority HARQ-ACK is transmitted in LP PUCCH, directly according to the number of received downlink transmissions corresponding to low-priority HARQ-ACK, a bit number of HARQ-ACK corresponding to each downlink transmission and a type (dynamic or semi-static) of low-priority HARQ-ACK codebook, and determines that A-bit high-priority HARQ-ACK is transmitted in HP PUCCH according to the number of received downlink transmissions corresponding to high-priority HARQ-ACK, a bit number of HARQ-ACK corresponding to each downlink transmission and a type (dynamic or semi-static) of high-priority HARQ-ACK codebook. The terminal transmits B-bit low-priority HARQ-ACK on LP PUCCH, and transmits A-bit high-priority HARQ-ACK on HP PUCCH, respectively. For the above case 2, the terminal determines that A-bit high-priority HARQ-ACK is transmitted in HP PUCCH (that is, there is no low-priority HARQ-ACK at this moment) according to the number of received downlink transmissions corresponding to high-priority HARQ-ACK, a bit number of HARQ-ACK corresponding to each downlink transmission and a type (dynamic or semi-static) of high-priority HARQ-ACK codebook, and transmits only the A-bit high-priority HARQ-ACK on HP PUCCH.

It is to be noted that, in the above embodiments, the above steps performed by the terminal and the network device are in no particular order, which are only to illustrate specific behaviors. In the above embodiments, it is only an example in which one DCI schedules one PDSCH and one PDSCH is corresponding to 1-bit feedback; if one DCI schedules multiple PDSCHs or one PDSCH is corresponding to multi-bit feedback (for example, in case of multiple TB or configured CBG), it only affects a result of a total bit number determined according to T-DAI and does not affect the above process of determining the bit number according to the first indication field, and the above method can be reused after corresponding replacement of the determined bit numbers.

In addition, in the above embodiments, if one of the PUCCHs or two PUCCHs are replaced by PUSCHs, the same applies; if high-priority PUCCH is replaced with a high-priority PUSCH, the first indication field exists in DCI that schedules high-priority PUSCH.

Moreover, the above 2-bit and 3-bit first indication fields are only examples, and 1 bit may also indicate different accumulated DCI numbers by means of modulo 2, and of course it may also be greater than 2 or 3 bits, etc. Corresponding relationship between different indication states and corresponding DCI numbers may also be changed, which are included in the embodiments of the present disclosure.

In the above embodiment, when HARQ-ACK with different priorities are replaced by HARQ-ACK of unicast and multicast or replaced by other two different UCI transmissions, the same applies.

In the embodiment of the present disclosure, when HARQ-ACKs of two different types collide in transmission, a first indication field in DCI corresponding to HARQ-ACK of a first type or corresponding to an uplink channel carrying the HARQ-ACK of the first type, can be used to determine a bit number of HARQ-ACK of a second type, thereby preventing transmission of HARQ-ACK of the first type from being affected by changes of the bit number of the HARQ-ACK of the second type due to packet loss.

Figure 8:
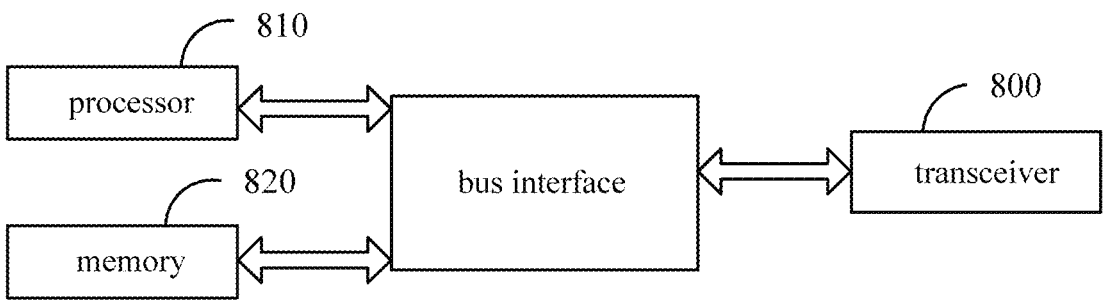
FIG. 8 is a structural diagram of a terminal according to an embodiment of the present disclosure.

Referring to FIG. 8, FIG. 8 is a structural diagram of a terminal according to an embodiment of the present disclosure. As shown in FIG. 8, the terminal includes a memory 820, a transceiver 800, and a processor 810.

The memory 820 is used to store a computer program. The transceiver 800 is used to send and receive data under control of the processor 810. The processor 810 is used to read the computer program in the memory 820 and perform the following operations:

receiving a first DCI, where a first indication field of the first DCI is used to determine at least one of the following: a bit number of a second HARQ-ACK, whether the second HARQ-ACK exists, whether the second HARQ-ACK is multiplexed with a first HARQ-ACK;

receiving HARQ-ACK according to the first indication field.

The first DCI is DCI corresponding to a first uplink channel carrying the first HARQ-ACK; and the second HARQ-ACK is HARQ-ACK multiplexed with the first HARQ-ACK.

The transceiver 800 is used to send and receive data under control of the processor 810.

In FIG. 8, a bus architecture may include any number of interconnected bus and bridge. Specifically, various circuits of one or more processors, which are represented by the processor 810, and one or more memories, which are represented by the memory 820, are linked together. The bus architecture may link various other circuits, such as a peripheral device, voltage regulator and a power management circuit together. These features are well known in this field; therefore, this disclosure does not make further description on these features. The bus interface provides an interface. The transceiver 800 may be multiple elements, including a transmitter and a receiver and provide units, which communicate with other devices on the transmission medium. The transmission medium includes wireless channels, wired channels, and optical cables. For different terminals, a user interface 830 may also be an interface capable of externally connecting required devices, and the connected devices include but are not limited to keypads, displays, speakers, microphones, joysticks, etc.

The processor 810 is responsible for managing the bus architecture and the normal processing. The memory 820 may be used to store data used by the processor 810 for performing operations.

Optionally, the processor 810 may be a central processing unit (CPU), an application specific integrated circuit (ASIC), a field-programmable gate array (FPGA) or a complex programmable logic device (CPLD). The processor may also adopt multi-core architecture.

The processor is used to call the computer program stored in the memory, and execute any method provided in the embodiments of the present disclosure according to obtained executable instructions. The processor and the memory may also be physically separated.

Optionally, a first DCI is received, where a first indication field of the first DCI is used to determine at least one of the following: a bit number of a second HARQ-ACK, whether the second HARQ-ACK exists, whether the second HARQ-ACK is multiplexed with a first HARQ-ACK; HARQ-ACK is transmitted according to the first indication field.

The first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates
a corresponding type of information used to determine the total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the first indication state indicates a corresponding type of information used to determine the total bit number of the second HARQ-ACK, where the total bit number is greater than 0; or, under a first condition, a second indication state of the first indication field is used to, indicate a type of information for determining a total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information used to determine the total bit number of the second HARQ-ACK, where the total bit number is greater than 0.

Optionally, the information for determining the total bit number of the second HARQ-ACK includes:

a total bit number of the second HARQ-ACK, or a total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining the bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; where the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; where the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to a size of the semi-static HARQ-ACK codebook; or, the first indication field at least includes a seventh indication state and an eighth indication state; where the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to a size of the semi-static HARQ-ACK codebook; or, the seventh indication state is used to indicate that the bit number of the second HARQ-ACK is 1 bit, or indicate that the bit number of the second HARQ-ACK is determined according to a fallback mode; the eighth indication state is used to, under a first condition, indicate that the bit number of the second HARQ-ACK is determined according to a size of the semi-static HARQ-ACK codebook; under a second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; where the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to a size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in the time domain between the first uplink channel and the second uplink channel, where the second uplink channel is a channel carrying the second HARQ-ACK.

The second condition includes:

there is no downlink transmission corresponding to the second HARQ-ACK; or, there is no downlink transmission with DCI scheduling corresponding to the second HARQ-ACK; or, there is no overlap in the time domain between the first uplink channel and the second uplink channel, where the second uplink channel is a channel carrying the second HARQ-ACK.

Optionally, in case that each indication state of the first indication field indicates a corresponding type of information for determining the total bit number of the second HARQ-ACK, if it is determined that there is overlap in the time domain between the second uplink channel that does not carry the second HARQ-ACK and the first uplink channel, indication information in the first indication field is ignored.

Optionally, in case that the first indication field includes the third indication state and the fourth indication state, if it is determined that there is overlap in the time domain between the second uplink channel that does not carry the second HARQ-ACK and the first uplink channel, indication information in the first indication field is ignored.

Optionally, the receiving HARQ-ACK according to the first indication field, includes:

determining the bit number of the second HARQ-ACK according to the first indication field;

receiving HARQ-ACK according to the bit number of the second HARQ-ACK.

Optionally, the receiving HARQ-ACK according to the bit number of the second HARQ-ACK, includes:

according to the bit number of the second HARQ-ACK, simultaneously transmitting the first HARQ-ACK and the second HARQ-ACK on the same channel; or, in case that the bit number of the second HARQ-ACK is greater than 0 or it is determined to transmit the second HARQ-ACK, simultaneously transmitting the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, transmitting the first HARQ-ACK on the first uplink channel.

Optionally, the determining the bit number of the second HARQ-ACK according to the first indication field, includes:

in case that there is overlap in the time domain between the first uplink channel carrying the first HARQ-ACK and the second uplink channel carrying the second HARQ-ACK, determining the bit number of the second HARQ-ACK according to the first indication field.

Optionally, the priority of the first uplink channel is higher than the priority of the second uplink channel carrying the second HARQ-ACK.

Optionally, the first uplink channel is one of PUCCH and PUSCH, the second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is a DCI used to schedule PDSCH that requires HARQ-ACK feedback on the PUCCH, or, the first DCI is a DCI used to indicate SPS PDSCH release that requires HARQ-ACK feedback on the PUCCH; or, in case that the first uplink channel is PUSCH, the first DCI is a DCI for scheduling the PUSCH.

Optionally, in case that there are multiple first DCIs, values of first indication fields in the multiple first DCIs are the same, or the terminal transmits HARQ-ACK according to a first indication field in the last DCI.

Optionally, the priority of the first HARQ-ACK is higher than the priority of the second HARQ-ACK; or the first HARQ-ACK is HARQ-ACK of a unicast, and the second HARQ-ACK is HARQ-ACK of a multicast.

Optionally, the first indication field is reuse of existing bits in the first DCI, or the first indication field is a newly added bit in the first DCI.

It is to be noted here that the foregoing terminal provided in the embodiments of the present disclosure can implement all steps implemented by the foregoing method embodiments, and can achieve the same technical effect. Parts and beneficial effects in this embodiment that are the same as those in the method embodiment will not be described in detail here.

Referring to FIG. 9, FIG. 9 is a structural diagram of a network device according to an embodiment of the present disclosure. As shown in FIG. 9, the network device includes a memory 920, a transceiver 900, and a processor 910.

The memory 920 is used to store a computer program. The transceiver 900 is used to send and receive data under control of the processor 910. The processor 910 is used to read the computer program in the memory 920 and perform the following operations:

transmitting a first downlink control information DCI, where a first indication field of the first DCI is used to determine at least one of the following: a bit number of a second HARQ-ACK, whether the second HARQ-ACK exists, whether the second HARQ-ACK is multiplexed with a first HARQ-ACK;

receiving HARQ-ACK according to the first indication field.

The first DCI is DCI corresponding to a first uplink channel carrying the first HARQ-ACK; and the second HARQ-ACK is HARQ-ACK multiplexed with the first HARQ-ACK.

The transceiver 900 is used to send and receive data under control of the processor 910.

In FIG. 9, a bus architecture may include any number of interconnected bus and bridge. Specifically, various circuits of one or more processors, which are represented by the processor 910, and one or more memories, which are represented by the memory 920, are linked together. The bus architecture may link various other circuits, such as a peripheral device, voltage regulator and a power management circuit together. These features are well known in this field; therefore, this disclosure does not make further description on these features. The bus interface provides an interface. The transceiver 900 may be multiple elements, including a transmitter and a receiver and provide units, which communicate with other devices on the transmission medium. The transmission medium includes wireless channels, wired channels, and optical cables. The processor 910 is responsible for managing the bus architecture and the normal processing. The memory 920 may be used to store data used by the processor 910 for performing operations.

Optionally, the processor 910 may be a central processing unit (CPU), an application specific integrated circuit (ASIC), a field-programmable gate array (FPGA) or a complex programmable logic device (CPLD). The processor may also adopt multi-core architecture.

The processor is used to call the computer program stored in the memory, and execute any method provided in the embodiments of the present disclosure according to obtained executable instructions. The processor and the memory may also be physically separated.

Optionally, in case that the second HARQ-ACK uses a dynamic HARQ-ACK codebook, each indication state of the first indication field indicates a corresponding type of information used to determine the total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the first indication state indicates a corresponding type of information used to determine the total bit number of the second HARQ-ACK, where the total bit number is greater than 0; or, under a first condition, a second indication state of the first indication field is used to, indicate a type of information for determining a total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information used to determine the total bit number of the second HARQ-ACK, where the total bit number is greater than 0.

Optionally, the information for determining the total bit number of the second HARQ-ACK includes:

a total bit number of the second HARQ-ACK, or a total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining the bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; where the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; where the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to a size of the semi-static HARQ-ACK codebook; or, the first indication field at least includes a seventh indication state and an eighth indication state; where the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to a size of the semi-static HARQ-ACK codebook; or, the seventh indication state is used to indicate that the bit number of the second HARQ-ACK is 1 bit, or indicate that the bit number of the second HARQ-ACK is determined according to a fallback mode; the eighth indication state is used to, under a first condition, indicate that the bit number of the second HARQ-ACK is determined according to a size of the semi-static HARQ-ACK codebook; under a second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; where the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to a size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in the time domain between the first uplink channel and the second uplink channel, where the second uplink channel is a channel carrying the second HARQ-ACK.

The second condition includes:

there is no downlink transmission corresponding to the second HARQ-ACK; or, there is no downlink transmission with DCI scheduling corresponding to the second HARQ-ACK; or, there is no overlap in the time domain between the first uplink channel and the second uplink channel, where the second uplink channel is a channel carrying the second HARQ-ACK.

Optionally, in case that each indication state of the first indication field indicates a corresponding type of information for determining the total bit number of the second HARQ-ACK, if it is determined that there is overlap in the time domain between the second uplink channel that does not carry the second HARQ-ACK and the first uplink channel, indication information in the first indication field can be arbitrarily set.

Optionally, in case that the first indication field includes the third indication state and the fourth indication state, if it is determined that there is overlap in the time domain between the second uplink channel that does not carry the second HARQ-ACK and the first uplink channel, indication information in the first indication field can be arbitrarily set.

Optionally, the receiving HARQ-ACK according to the first indication field, includes:

determining a bit number of the second HARQ-ACK, according to the first indication field;

receiving HARQ-ACK according to the bit number of the second HARQ-ACK.

Optionally, the receiving HARQ-ACK according to the bit number of the second HARQ-ACK, includes:

according to the bit number of the second HARQ-ACK, simultaneously receiving the first HARQ-ACK and the second HARQ-ACK on the same channel; or, in case that the bit number of the second HARQ-ACK is greater than 0 or it is determined to transmit the second HARQ-ACK, simultaneously receiving the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, receiving the first HARQ-ACK on the first uplink channel.

Optionally, the determining a bit number of the second HARQ-ACK, according to the first indication field, includes:

in case that there is overlap in the time domain between the first uplink channel carrying the first HARQ-ACK and the second uplink channel carrying the second HARQ-ACK, determining, by the network device, the bit number of the second HARQ-ACK, according to the first indication field.

Optionally, the priority of the first uplink channel is higher than the priority of the second uplink channel carrying the second HARQ-ACK.

Optionally, the first uplink channel is one of PUCCH and PUSCH, the second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is a DCI used to schedule PDSCH that requires HARQ-ACK feedback on the PUCCH, or, the first DCI is a DCI used to indicate SPS PDSCH release that requires HARQ-ACK feedback on the PUCCH; or, in case that the first uplink channel is PUSCH, the first DCI is a DCI for scheduling the PUSCH.

Optionally, in case that there are multiple first DCIs, values of first indication fields in the multiple first DCIs are the same, or HARQ reception is performed according to a first indication field in the last DCI.

Optionally, the priority of the first HARQ-ACK is higher than the priority of the second HARQ-ACK; or the first HARQ-ACK is HARQ-ACK of a unicast, and the second HARQ-ACK is HARQ-ACK of a multicast.

Optionally, the first indication field is reuse of existing bits in the first DCI, or the first indication field is a newly added bit in the first DCI.

It is to be noted here that the foregoing network device provided in the embodiments of the present disclosure can implement all steps implemented by the foregoing method embodiments, and can achieve the same technical effect. Parts and beneficial effects in this embodiment that are the same as those in the method embodiment will not be described in detail here.

Referring to FIG. 10, FIG. 10 is a structural diagram of a terminal according to an embodiment of the present disclosure. As shown in FIG. 10, the terminal 1000 includes:

a reception unit 1001 configured for the terminal to receive a first DCI, where a first indication field of the first DCI is used to determine at least one of the following: a bit number of a second HARQ-ACK, whether the second HARQ-ACK exists, whether second HARQ-ACK is multiplexed with a first HARQ-ACK;

a transmission unit 1002 used to receive HARQ-ACK according to the first indication field.

The first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates a corresponding type of information used to determine the total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the first indication state indicates a corresponding type of information used to determine the total bit number of the second HARQ-ACK, where the total bit number is greater than 0; or, under a first condition, a second indication state of the first indication field is used to, indicate a type of information for determining a total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information used to determine the total bit number of the second HARQ-ACK, where the total bit number is greater than 0.

Optionally, the information for determining the total bit number of the second HARQ-ACK includes:

a total bit number of the second HARQ-ACK, or a total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining the bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; where the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; where the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to a size of the semi-static HARQ-ACK codebook; or, the first indication field at least includes a seventh indication state and an eighth indication state; where the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to a size of the semi-static HARQ-ACK codebook; or, the seventh indication state is used to indicate that the bit number of the second HARQ-ACK is 1 bit, or indicate that the bit number of the second HARQ-ACK is determined according to a fallback mode; the eighth indication state is used to, under a first condition, indicate that the bit number of the second HARQ-ACK is determined according to a size of the semi-static HARQ-ACK codebook; under a second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; where the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to a size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in the time domain between the first uplink channel and the second uplink channel, where the second uplink channel is a channel carrying the second HARQ-ACK.

The second condition includes:

there is no downlink transmission corresponding to the second HARQ-ACK; or, there is no downlink transmission with DCI scheduling corresponding to the second HARQ-ACK; or, there is no overlap in the time domain between the first uplink channel and the second uplink channel, where the second uplink channel is a channel carrying the second HARQ-ACK.

Optionally, in case that each indication state of the first indication field indicates a corresponding type of information for determining the total bit number of the second HARQ-ACK, if it is determined that there is overlap in the time domain between the second uplink channel that does not carry the second HARQ-ACK and the first uplink channel, indication information in the first indication field is ignored.

Optionally, in case that the first indication field includes the third indication state and the fourth indication state, if it is determined that there is overlap in the time domain between the second uplink channel that does not carry the second HARQ-ACK and the first uplink channel, indication information in the first indication field is ignored.

Optionally, the transmission unit 1002 includes:

a determination sub-unit used to determine the bit number of the second HARQ-ACK according to the first indication field;

a transmission sub-unit used to receive HARQ-ACK according to the bit number of the second HARQ-ACK.

Optionally, the transmission sub-unit is used to, according to the bit number of the second HARQ-ACK, simultaneously transmit the first HARQ-ACK and the second HARQ-ACK on the same channel; or, in case that the bit number of the second HARQ-ACK is greater than 0 or it is determined to transmit the second HARQ-ACK, simultaneously transmit the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, transmit the first HARQ-ACK on the first uplink channel.

Optionally, the determination sub-unit is used to, in case that there is overlap in the time domain between the first uplink channel carrying the first HARQ-ACK and the second uplink channel carrying the second HARQ-ACK, determine the bit number of the second HARQ-ACK according to the first indication field.

Optionally, the priority of the first uplink channel is higher than the priority of the second uplink channel carrying the second HARQ-ACK.

Optionally, the first uplink channel is one of PUCCH and PUSCH, the second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is a DCI used to schedule PDSCH that requires HARQ-ACK feedback on the PUCCH, or, the first DCI is a DCI used to indicate SPS PDSCH release that requires HARQ-ACK feedback on the PUCCH; or, in case that the first uplink channel is PUSCH, the first DCI is a DCI for scheduling the PUSCH.

Optionally, in case that there are multiple first DCIs, values of first indication fields in the multiple first DCIs are the same, or the terminal transmits HARQ-ACK according to a first indication field in the last DCI.

Optionally, the priority of the first HARQ-ACK is higher than the priority of the second HARQ-ACK; or the first HARQ-ACK is HARQ-ACK of a unicast, and the second HARQ-ACK is HARQ-ACK of a multicast.

Optionally, the first indication field is reuse of existing bits in the first DCI, or the first indication field is a newly added bit in the first DCI.

It is to be noted here that the foregoing terminal provided in the embodiments of the present disclosure can implement all steps implemented by the foregoing method embodiments, and can achieve the same technical effect. Parts and beneficial effects in this embodiment that are the same as those in the method embodiment will not be described in detail here.

Referring to FIG. 11, FIG. 11 is a structural diagram of a network device according to an embodiment of the present disclosure. As shown in FIG. 11, the network device 1100 includes:

a transmission unit 1101 configured for the network device to transmit a first downlink control information DCI, where a first indication field of the first DCI is used to determine at least one of the following: a bit number of a second HARQ-ACK, whether the second HARQ-ACK exists, whether the second HARQ-ACK is multiplexed with a first HARQ-ACK;

a reception unit 1102 used to receive HARQ-ACK according to the first indication field.

The first DCI is DCI corresponding to a first uplink channel carrying the first HARQ-ACK; and the second HARQ-ACK is HARQ-ACK multiplexed with the first HARQ-ACK.

Optionally, in case that the second HARQ-ACK uses a dynamic HARQ-ACK codebook, each indication state of the first indication field indicates a corresponding type of information used to determine the total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the first indication state indicates a corresponding type of information used to determine the total bit number of the second HARQ-ACK, where the total bit number is greater than 0; or, under a first condition, a second indication state of the first indication field is used to, indicate a type of information for determining a total bit number of the second HARQ-ACK, where the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information used to determine the total bit number of the second HARQ-ACK, where the total bit number is greater than 0.

Optionally, the information for determining the total bit number of the second HARQ-ACK includes:

a total bit number of the second HARQ-ACK, or a total number of downlink transmissions corresponding to the second HARQ-ACK.

Optionally, when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining the bit number of a sub-codebook corresponding to the each sub-indication field of the second HARQ-ACK.

Optionally, in case that the second HARQ-ACK uses a semi-static HARQ-ACK codebook, the first indication field at least includes a third indication state and a fourth indication state; where the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; where the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to a size of the semi-static HARQ-ACK codebook; or, the first indication field at least includes a seventh indication state and an eighth indication state; where the seventh indication state is used to, under a first condition, indicate that the bit number of the second HARQ-ACK is 1 bit, or indicate that the bit number of the second HARQ-ACK is determined according to a fall-back mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to a size of the semi-static HARQ-ACK codebook; or, the seventh indication state is used to indicate that the bit number of the second HARQ-ACK is 1 bit, or indicate that the bit number of the second HARQ-ACK is determined according to a fallback mode; the eighth indication state is used to, under a first condition, indicate that the bit number of the second HARQ-ACK is determined according to a size of the semi-static HARQ-ACK codebook; under a second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; where the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to a size of the semi-static HARQ-ACK codebook.

Optionally, the first condition includes:

there is a downlink transmission corresponding to the second HARQ-ACK; or there is a downlink transmission with DCI scheduling corresponding to the second HARQ-ACK; or, there is overlap in the time domain between the first uplink channel and the second uplink channel, where the second uplink channel is a channel carrying the second HARQ-ACK.

The second condition includes:

there is no downlink transmission corresponding to the second HARQ-ACK; or, there is no downlink transmission with DCI scheduling corresponding to the second HARQ-ACK; or, there is no overlap in the time domain between the first uplink channel and the second uplink channel, where the second uplink channel is a channel carrying the second HARQ-ACK.

Optionally, in case that each indication state of the first indication field indicates a corresponding type of information for determining the total bit number of the second HARQ-ACK, if it is determined that there is overlap in the time domain between the second uplink channel that does not carry the second HARQ-ACK and the first uplink channel, indication information in the first indication field can be arbitrarily set.

Optionally, in case that the first indication field includes the third indication state and the fourth indication state, if it is determined that there is overlap in the time domain between the second uplink channel that does not carry the second HARQ-ACK and the first uplink channel, indication information in the first indication field can be arbitrarily set.

Optionally, the reception unit 1102 includes:

a determination sub-unit used to determine a bit number of the second HARQ-ACK, according to the first indication field;

a reception sub-unit used to receive HARQ-ACK according to the bit number of the second HARQ-ACK.

Optionally, the reception sub-unit is used to, according to the bit number of the second HARQ-ACK, simultaneously receive the first HARQ-ACK and the second HARQ-ACK on the same channel; or, in case that the bit number of the second HARQ-ACK is greater than 0 or it is determined that the terminal transmits the second HARQ-ACK, simultaneously receive the first HARQ-ACK and the second HARQ-ACK on the same channel, according to the bit number of the second HARQ-ACK; or, in case that the bit number of the second HARQ-ACK is 0 or it is determined that the terminal does not transmit the second HARQ-ACK, receive the first HARQ-ACK on the first uplink channel.

Optionally, the determination sub-unit is used to, in case that there is overlap in the time domain between the first uplink channel carrying the first HARQ-ACK and the second uplink channel carrying the second HARQ-ACK, determine the bit number of the second HARQ-ACK, according to the first indication field.

Optionally, the priority of the first uplink channel is higher than the priority of the second uplink channel carrying the second HARQ-ACK.

Optionally, the first uplink channel is one of PUCCH and PUSCH, the second uplink channel carrying the second HARQ-ACK is one of PUCCH and PUSCH, and channel types of the first uplink channel and the second uplink channel are the same or different.

Optionally, whether the first indication field exists in the first DCI is determined according to configuration of high-layer signaling; or, the first indication field always exists in the first DCI by default.

Optionally, in case that the first uplink channel is PUCCH, the first DCI is a DCI used to schedule PDSCH that requires HARQ-ACK feedback on the PUCCH, or, the first DCI is a DCI used to indicate SPS PDSCH release that requires HARQ-ACK feedback on the PUCCH; or, in case that the first uplink channel is PUSCH, the first DCI is a DCI for scheduling the PUSCH.

Optionally, in case that there are multiple first DCIs, values of first indication fields in the multiple first DCIs are the same, or receiving HARQ is performed according to a first indication field in the last DCI.

Optionally, the priority of the first HARQ-ACK is higher than the priority of the second HARQ-ACK; or the first HARQ-ACK is HARQ-ACK of a unicast, and the second HARQ-ACK is HARQ-ACK of a multicast.

Optionally, the first indication field is reuse of existing bits in the first DCI, or the first indication field is a newly added bit in the first DCI.

It is to be noted here that the foregoing network device provided in the embodiments of the present disclosure can implement all steps implemented by the foregoing method embodiments, and can achieve the same technical effect. Parts and beneficial effects in this embodiment that are the same as those in the method embodiment will not be described in detail here.

It is to be noted that division of units in the embodiment of the present disclosure is exemplary, and is only a logical function division, and there may be another division manner in actual implementation. In addition, each functional unit in each embodiment of the present application may be integrated into one processing unit, each unit may exist separately physically, or two or more units may be integrated into one unit. The foregoing integrated units may be implemented in the form of hardware or in the form of software functional units.

If the integrated units are realized in the form of software function units and sold or used as independent products, they may be stored in a processor-readable storage medium. Based on this understanding, the essence of the technical solution of the present disclosure or the part that contributes to the related art or the part of the technical solution may be embodied in the form of a software product. The computer software product is stored in a storage medium, includes several instructions which enables a computer device (which may be a personal computer, a server, or a network device, etc.) or a processor to execute all or part of the steps of the methods described in various embodiments of the present disclosure. The storage medium includes various media capable of storing program codes such as U disk, mobile hard disk, ROM, RAM, magnetic disk or optical disk.

One embodiment of the present disclosure further provides a processor-readable storage medium which includes a computer program stored thereon. The computer program is used to cause the processor to execute the uplink control information transmission method provided in the embodiment of the present disclosure, or, the computer program is used to cause the processor to execute the uplink control information reception method provided in the embodiment of the present disclosure.

The processor-readable storage medium may be any available medium or data storage device that can be accessed by a processor, including but not limited to magnetic storage (such as floppy disk, hard disk, magnetic tape, magneto-optical disk (MO)), optical storage (such as CD, DVD, BD, HVD), and semiconductor memory (such as ROM, EPROM, EEPROM, non-volatile memory (Nand flash), solid-state drive (SSD)).

Those skilled in the art should understand that the embodiments of the present application may be provided as methods, systems, or computer program products. Accordingly, in this application, an entirely hardware embodiment, an entirely software embodiment, or an embodiment combining software and hardware aspects may be adopted. Further, this application may adopt the form of a computer program product implemented on one or more computer available storage media (including but not limited to disk memory and optical memory) including computer available program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These processor-executable instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These processor-executable instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Persons having ordinary skill in the art may clearly understand that, for convenient and concise of the description, specific work process of foregoing system, device and unit may refer to a corresponding process in method embodiments, which are not repeated here.

In the embodiments provided in the present disclosure, it should be understood that the disclosed devices and methods may be implemented in other ways. For example, the device embodiments described above are only an example. For example, division of units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may or may not be physically separated, and components shown as units may or may not be physical units, that is, they may be located in one place, or may be distributed to multiple network units. Part or all of the units may be selected according to actual needs to achieve the purpose of the solutions of the embodiments of the present disclosure.

In addition, various functional units in various embodiments of the present disclosure may be integrated into one processing unit, or each unit may be physically included individually, or two or more units may be integrated into one unit.

Through description of the above embodiments, persons having ordinary skill in the art can clearly understand that the methods of the above embodiments may be implemented by means of software plus a necessary general-purpose hardware platform, and of course may also be implemented by hardware, but in many cases the former is better implementation. Based on this understanding, the essence of the technical solution of the present disclosure or the part that contributes to the related art or the part of the technical solution may be embodied in the form of a software product. The computer software product is stored in a storage medium (such as ROM/RAM, magnetic disk or optical disk), includes several instructions which enables a terminal (which may be a mobile phone, computer, server, air conditioner, or network device, etc.) to execute all or part of the steps of the methods described in various embodiments of the present disclosure.

Persons having ordinary skill in the art can understand that all or part of the processes in the foregoing method embodiments can be implemented by controlling relevant hardware through a computer program. The program may be stored in a computer readable storage medium. The program is executed to perform procedures of the foregoing method embodiments. The storage medium may be a magnetic disk, an optical disc, a read-only memory (ROM), or a random access memory (RAM), etc.

It can be understood that those embodiments described in the embodiments of the present disclosure may be implemented by hardware, software, firmware, middleware, microcode, or a combination thereof. For implementation with hardware, modules, units, sub-units may be implemented in one or more application specific integrated circuits (ASIC), a digital signal processor (DSP), a digital signal processing device (DSP Device, DSPD), a programmable logic device (PLD), a field-programmable gate array (PFGA), a general processor, a controller, a micro-controller, a microprocessor, another electronic unit for implementing the functions of the present disclosure, or their combinations.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

Obviously, persons having ordinary skill in the art may make various modifications and variations to the present application without departing from the spirit and scope of the present application. In this way, if these modifications and variations of the present application fall within the scope of the claims of the present application and their equivalent technologies, the present application is also intended to include these modifications and variations.

What is claimed is:

1. An uplink control information transmission method, comprising:

receiving, by a terminal, a first downlink control information (DCI), wherein a first indication field of the first DCI is used to determine at least one of the following: a bit number of a second hybrid automatic repeat request-acknowledgement (HARQ-ACK), whether the second HARQ-ACK exists, or whether the second HARQ-ACK is multiplexed with a first HARQ-ACK; and transmitting, by the terminal, HARQ-ACK according to the first indication field;

wherein the first DCI is a DCI corresponding to a first uplink channel carrying the first HARQ-ACK.

2. The method according to claim 1, wherein in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indication field except for the first indication state indicates a corresponding type of information for determining the total bit number of the second HARQ-ACK, wherein the total bit number is greater than 0; or, under a first condition, a second indication state of the first indication field is used to, indicate a type of information for determining the total bit number of the second HARQ-ACK, wherein the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information for determining the total bit number of the second HARQ-ACK, wherein the total bit number is greater than 0;

or, wherein in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indication state and an eighth indication state; wherein the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

3. The method according to claim 2, wherein the information for determining the total bit number of the second HARQ-ACK includes:

the total bit number of the second HARQ-ACK, or the total number of downlink transmissions corresponding to the second HARQ-ACK; and/or, wherein when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK;

or, wherein the first condition includes: there is a downlink transmission corresponding to the second HARQ-ACK; or there is a downlink transmission with DCI scheduling corresponding to the second HARQ-ACK; or, there is overlap in time domain between the first uplink channel and a second uplink channel, wherein the second uplink channel is a channel carrying the second HARQ-ACK; the second condition includes: there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK;

or, wherein in case that each indication state of the first indication field indicates a corresponding type of information for determining the total bit number of the second HARQ-ACK, if it is determined that there is overlap in time domain between a second uplink channel that does not carry the second HARQ-ACK and the first uplink channel, indication information in the first indication field is ignored;

or, wherein in case that the first indication field includes the third indication state and the fourth indication state, if it is determined that there is overlap in time domain between a second uplink channel that does not carry the second HARQ-ACK and the first uplink channel, indication information in the first indication field is ignored.

4. The method according to claim 1, wherein the transmitting, by the terminal, HARQ-ACK according to the first indication field, includes:

determining, by the terminal, the bit number of the second HARQ-ACK according to the first indication field; and transmitting, by the terminal, HARQ-ACK according to the bit number of the second HARQ-ACK.

5. The method according to claim 4, wherein the transmitting, by the terminal, HARQ-ACK according to the bit number of the second HARQ-ACK, includes:

according to the bit number of the second HARQ-ACK, simultaneously transmitting the first HARQ-ACK and the second HARQ-ACK on the same channel; or, in case that the bit number of the second HARQ-ACK is greater than 0 or it is determined to transmit the second HARQ-ACK, simultaneously transmitting the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, transmitting the first HARQ-ACK on the first uplink channel;

and/or, wherein the determining, by the terminal, the bit number of the second HARQ-ACK according to the first indication field, includes:

in case that there is overlap in the time domain between the first uplink channel carrying the first HARQ-ACK and the second uplink channel carrying the second HARQ-ACK, determining, by the terminal, the bit number of the second HARQ-ACK according to the first indication field.

6. The method according to claim 1, wherein a priority of the first uplink channel is higher than a priority of a second uplink channel carrying the second HARQ-ACK; or, a priority of the first HARQ-ACK is higher than a priority of the second HARQ-ACK; or the first HARQ-ACK is HARQ-ACK of a unicast, and the second HARQ-ACK is HARQ-ACK of a multicast;

or, wherein the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different;

or, wherein whether the first indication field exists in the first DCI is determined according to configuration of high-layer signaling; or, the first indication field always exists in the first DCI by default;

or, wherein in case that the first uplink channel is PUCCH, the first DCI is DCI used to schedule PDSCH that requires HARQ-ACK feedback on the PUCCH, or, the first DCI is DCI used to indicate semi-persistent scheduling (SPS) PDSCH release that requires HARQ-ACK feedback on the PUCCH; or, in case that the first uplink channel is PUSCH, the first DCI is DCI for scheduling the PUSCH;

or, wherein in case that there are multiple first DCIs, values of first indication fields in the multiple first DCIs are the same, or the terminal transmits HARQ-ACK according to the first indication field in the last DCI.

7. An uplink control information reception method, comprising:

transmitting, by a network device, a first downlink control information (DCI), wherein a first indication field of the first DCI is used to determine at least one of the following: a bit number of a second HARQ-ACK, whether the second HARQ-ACK exists, or whether the second HARQ-ACK is multiplexed with a first HARQ-ACK; and receiving, by the network device, HARQ-ACK according to the first indication field;

wherein the first DCI is DCI corresponding to a first uplink channel carrying the first HARQ-ACK.

8. The method according to claim 7, wherein in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indication field except for the first indication state indicates a corresponding type of information for determining the total bit number of the second HARQ-ACK, wherein the total bit number is greater than 0; or, under a first condition, a second indication state of the first indication field is used to, indicate a type of information for determining the total bit number of the second HARQ-ACK, wherein the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indication state indicates a corresponding type of information for determining the total bit number of the second HARQ-ACK, wherein the total bit number is greater than 0;

or, wherein in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indication state and an eighth indication state; wherein the seventh indication state is used to, under a first condition, indicate that the bit number of the second HARQ-ACK is 1 bit, or indicate that the bit number of the second HARQ-ACK is determined according to a fallback mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

9. The method according to claim 8, wherein the information for determining the total bit number of the second HARQ-ACK includes:

the total bit number of the second HARQ-ACK, or the total number of downlink transmissions corresponding to the second HARQ-ACK;

and/or, wherein when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK;

or, wherein the first condition includes: there is a downlink transmission corresponding to the second HARQ-ACK; or there is a downlink transmission with DCI scheduling corresponding to the second HARQ-ACK; or, there is overlap in time domain between the first uplink channel and a second uplink channel, wherein the second uplink channel is a channel carrying the second HARQ-ACK; the second condition includes: there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK.

10. The method according to claim 7, wherein the receiving, by the network device, HARQ-ACK according to the first indication field, includes:

determining, by the network device, the bit number of the second HARQ-ACK, according to the first indication field; and receiving, by the network device, HARQ-ACK according to the bit number of the second HARQ-ACK.

11. The method according to claim 10, wherein the receiving, by the network device, HARQ-ACK according to the bit number of the second HARQ-ACK, includes:

according to the bit number of the second HARQ-ACK, simultaneously receiving the first HARQ-ACK and the second HARQ-ACK on the same channel; or, in case that the bit number of the second HARQ-ACK is greater than 0 or it is determined to transmit the second HARQ-ACK, simultaneously receiving the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, receiving the first HARQ-ACK on the first uplink channel;

or, wherein the determining, by the network device, the bit number of the second HARQ-ACK, according to the first indication field, includes:

in case that there is overlap in time domain between the first uplink channel carrying the first HARQ-ACK and the second uplink channel carrying the second HARQ-ACK, determining, by the network device, the bit number of the second HARQ-ACK, according to the first indication field.

12. The method according to claim 7, wherein a priority of the first uplink channel is higher than a priority of a second uplink channel carrying the second HARQ-ACK; or, a priority of the first HARQ-ACK is higher than a priority of the second HARQ-ACK; or the first HARQ-ACK is HARQ-ACK of a unicast, and the second HARQ-ACK is HARQ-ACK of a multicast;

or, wherein the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different;

or, wherein whether the first indication field exists in the first DCI is determined according to configuration of high-layer signaling; or, the first indication field always exists in the first DCI by default;

or, wherein in case that the first uplink channel is PUCCH, the first DCI is DCI used to schedule PDSCH that requires HARQ-ACK feedback on the PUCCH, or, the first DCI is DCI used to indicate semi-persistent sched-uling (SPS) PDSCH release that requires HARQ-ACK feedback on the PUCCH; or, in case that the first uplink channel is PUSCH, the first DCI is DCI for scheduling the PUSCH;

or, wherein in case that there are multiple first DCIs, values of first indication fields in the multiple first DCIs are set to be the same, or HARQ-ACK is transmitted accord-ing to the first indication field in the last DCI.

13. A terminal, comprising: a memory, a transceiver and a processor;

wherein the memory is used to store a computer program; the transceiver is used to send and receive data under control of the processor; the processor is used to read the computer program in the memory 820 and perform the following operations:

receiving a first downlink control information (DCI), wherein a first indication field of the first DCI is used to determine at least one of the following: a bit number of a second hybrid automatic repeat request-acknowl-edgement (HARQ-ACK), whether the second HARQ-ACK exists, or whether the second HARQ-ACK is multiplexed with a first HARQ-ACK; and transmitting HARQ-ACK according to the first indication field;

wherein the first DCI is DCI corresponding to a first uplink channel carrying the first HARQ-ACK.

14. The terminal according to claim 13, wherein in case that the second HARQ-ACK uses a dynamic HARQ-ACK codebook, each indication state of the first indication field indicates a corresponding type of information for determining a total bit number of the second HARQ-ACK; or a first indication state of the first indication field is used to indicate that the second HARQ-ACK does not exist, or the second HARQ-ACK is not multiplexed with the first HARQ-ACK, or the total bit number of the second HARQ-ACK is 0, or a total number of downlink transmissions corresponding to the second HARQ-ACK is 0; and each indication state in the first indica-tion field except for the first indication state indicates a corresponding type of information for determining the total bit number of the second HARQ-ACK, wherein the total bit number is greater than 0; or, under a first condition, a second indication state of the first indication field is used to, indicate a type of information for determining the total bit number of the second HARQ-ACK, wherein the total bit number is greater than 0; under a second condition, the second indication state is used to indicate that the second HARQ-ACK does not exist, or the second HARQ-ACK is not multiplexed with the first HARQ-ACK, or the total bit number of the second HARQ-ACK is 0, or the total number of downlink transmissions corresponding to the second HARQ-ACK is 0; and each indication state in the first indication field except for the second indi-cation state indicates a corresponding type of informa-tion for determining the total bit number of the second HARQ-ACK, wherein the total bit number is greater than 0;

or, wherein in case that the second HARQ-ACK uses a semi-static HARQ-ACK codebook, the first indication field at least includes a third indication state and a fourth indication state; wherein the third indication state is used to indicate that the bit number of the second HARQ-ACK is 1 bit, or the bit number of the second HARQ-ACK is determined according to a fallback mode; and the fourth indication state is used to indicate that the bit number of the second HARQ-ACK is determined according to a size of the semi-static HARQ-ACK codebook; or, the first indication field at least includes a fifth indication state and a sixth indication state; wherein the fifth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the sixth indication state is used to indicate that the bit number of the second HARQ-ACK is determined according to the size of the semi-static HARQ-ACK codebook; or, the first indication field at least includes a seventh indi-cation state and an eighth indication state; wherein the seventh indication state is used to, under a first condi-tion, indicate that the bit number of the second HARQ-ACK is 1 bit, or indicate that the bit number of the second HARQ-ACK is determined according to a fall-back mode; under a second condition, the seventh indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the eighth indication state is used to indicate that the bit number of the second HARQ-ACK is determined according to the size of the semi-static HARQ-ACK codebook; or, the seventh indication state is used to indicate that the bit number of the second HARQ-ACK is 1 bit, or the bit number of the second HARQ-ACK is determined according to a fallback mode; the eighth indication state is used to, under the first condition, indicate that the bit number of the second HARQ-ACK is determined according to the size of the semi-static HARQ-ACK codebook; under the second condition, the eighth indication state is used to indicate that the second HARQ-ACK does not exist, or the second HARQ-ACK is not multiplexed with the first HARQ-ACK, or the bit number of the second HARQ-ACK is 0, or the number of downlink trans-missions corresponding to the second HARQ-ACK is 0; or, the first indication field at least includes a ninth indication state, a tenth indication state and an eleventh indication state; wherein the ninth indication state is used to indicate that the second HARQ-ACK does not exist, or the second HARQ-ACK is not multiplexed with the first HARQ-ACK, or the bit number of the second HARQ-ACK is 0, or the number of downlink transmissions corresponding to the second HARQ-ACK is 0; the tenth indication state is used to indicate that the bit number of the second HARQ-ACK is 1 bit, or indicate that the bit number of the second HARQ-ACK is determined according to a fallback mode; the eleventh indication state is used to indicate that the bit number of the second HARQ-ACK is determined according to the size of the semi-static HARQ-ACK codebook.

15. The terminal according to claim 14, wherein the information for determining the total bit number of the second HARQ-ACK includes:

the total bit number of the second HARQ-ACK, or the total number of downlink transmissions corresponding to the second HARQ-ACK;

and/or, wherein when the first indication field indicates information for determining the total bit number of the second HARQ-ACK, in case that a dynamic HARQ-ACK codebook of the second HARQ-ACK includes multiple sub-codebooks, the first indication field includes multiple sub-indication fields, and each sub-indication field is used to indicate information for determining a bit number of a sub-codebook corresponding to the each sub-indication field of the second HARQ-ACK;

or, wherein the first condition includes: there is a downlink transmission corresponding to the second HARQ-ACK; or there is a downlink transmission with DCI scheduling corresponding to the second HARQ-ACK; or, there is overlap in time domain between the first uplink channel and a second uplink channel, wherein the second uplink channel is a channel carrying the second HARQ-ACK; the second condition includes: there is no downlink transmission corresponding to the second HARQ-ACK; or, there is no downlink transmission with DCI scheduling corresponding to the second HARQ-ACK; or, there is no overlap in time domain between the first uplink channel and the second uplink channel, wherein the second uplink channel is a channel carrying the second HARQ-ACK;

or wherein in case that each indication state of the first indication field indicates a corresponding type of information for determining the total bit number of the second HARQ-ACK, if it is determined that there is overlap in time domain between a second uplink channel that does not carry the second HARQ-ACK and the first uplink channel, indication information in the first indication field is ignored;

or, wherein in case that the first indication field includes the third indication state and the fourth indication state, if it is determined that there is overlap in time domain between a second uplink channel that does not carry the second HARQ-ACK and the first uplink channel, indication information in the first indication field is ignored.

16. The terminal according to claim 13, wherein the transmitting HARQ-ACK according to the first indication field, includes:

determining the bit number of the second HARQ-ACK according to the first indication field; and transmitting HARQ-ACK according to the bit number of the second HARQ-ACK.

17. The terminal according to claim 16, wherein the transmitting HARQ-ACK according to the bit number of the second HARQ-ACK, includes:

according to the bit number of the second HARQ-ACK, simultaneously transmitting the first HARQ-ACK and the second HARQ-ACK on the same channel; or, in case that the bit number of the second HARQ-ACK is greater than 0 or it is determined to transmit the second HARQ-ACK, simultaneously transmitting the first HARQ-ACK and the second HARQ-ACK on the same channel, according to the bit number of the second HARQ-ACK; or, in case that the bit number of the second HARQ-ACK is 0 or it is determined to not transmit the second HARQ-ACK, transmitting the first HARQ-ACK on the first uplink channel;

and/or, wherein the determining the bit number of the second HARQ-ACK according to the first indication field, includes:

in case that there is overlap in the time domain between the first uplink channel carrying the first HARQ-ACK and the second uplink channel carrying the second HARQ-ACK, determining the bit number of the second HARQ-ACK according to the first indication field.

18. The terminal according to claim 13, wherein a priority of the first uplink channel is higher than a priority of a second uplink channel carrying the second HARQ-ACK; or, a priority of the first HARQ-ACK is higher than a priority of the second HARQ-ACK; or the first HARQ-ACK is HARQ-ACK of a unicast, and the second HARQ-ACK is HARQ-ACK of a multicast;

or, wherein the first uplink channel is one of physical uplink control channel (PUCCH) and physical uplink shared channel (PUSCH), a second uplink channel carrying the second HARQ-ACK is one of PUCCH and PUSCH, and channel types of the first uplink channel and the second uplink channel are the same or different;

or, wherein whether the first indication field exists in the first DCI is determined according to configuration of high-layer signaling; or, the first indication field always exists in the first DCI by default;

or, wherein in case that the first uplink channel is PUCCH, the first DCI is DCI used to schedule PDSCH that requires HARQ-ACK feedback on the PUCCH, or, the first DCI is DCI used to indicate semi-persistent scheduling (SPS) PDSCH release that requires HARQ-ACK feedback on the PUCCH; or, in case that the first uplink channel is PUSCH, the first DCI is DCI for scheduling the PUSCH;

or, wherein in case that there are multiple first DCIs, values of first indication fields in the multiple first DCIs are the same, or the terminal transmits HARQ-ACK according to the first indication field in the last DCI.

19. A network device, comprising: a memory, a transceiver and a processor;

wherein the memory is used to store a computer program; the transceiver is used to send and receive data under control of the processor; the processor is used to read the computer program in the memory 829 and perform the method according to claim 17.

* * * * *